US008441674B2

(12) United States Patent
Hosoi

(10) Patent No.: US 8,441,674 B2
(45) Date of Patent: May 14, 2013

(54) IMAGE FORMING APPARATUS

(75) Inventor: Tetsuya Hosoi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1320 days.

(21) Appl. No.: 11/679,256

(22) Filed: Feb. 27, 2007

(65) Prior Publication Data
US 2007/0211295 A1 Sep. 13, 2007

(30) Foreign Application Priority Data

Mar. 13, 2006 (JP) ................................ 2006-067820
Feb. 20, 2007 (JP) ................................ 2007-039302

(51) Int. Cl.
*G06K 15/00* (2006.01)

(52) U.S. Cl.
USPC ........... 358/1.18; 358/450; 358/498; 358/1.9; 399/204; 399/376

(58) Field of Classification Search ............... 358/1.18, 358/1.9, 475, 498, 496, 450; 382/232, 276, 382/280, 282, 300, 311; 399/204, 376
See application file for complete search history.

(56) References Cited

U.S. PATENT DOCUMENTS

| | | | | |
|---|---|---|---|---|
| 4,814,822 A * | 3/1989 | Acquaviva et al. | ........... | 399/204 |
| 5,040,019 A * | 8/1991 | Ito | .................. | 355/50 |
| 5,301,262 A * | 4/1994 | Kashiwagi | .................. | 358/1.18 |
| 5,568,281 A * | 10/1996 | Kochis et al. | ............... | 358/475 |
| 5,606,429 A * | 2/1997 | Sheldon et al. | ............... | 358/450 |
| 5,959,743 A * | 9/1999 | Tanaka | ........................... | 358/450 |
| 6,516,178 B2 * | 2/2003 | Fukushima | .................... | 399/376 |
| 6,594,403 B1 * | 7/2003 | Bozdagi et al. | ............... | 382/284 |
| 6,642,943 B1 * | 11/2003 | Machida | ....................... | 715/763 |
| 6,753,986 B1 * | 6/2004 | Sato | .............................. | 358/505 |
| 6,822,768 B1 * | 11/2004 | McCoy | ........................ | 358/498 |
| 7,184,169 B2 * | 2/2007 | Kropf et al. | .................. | 358/1.18 |
| 7,260,275 B2 * | 8/2007 | Shiraishi et al. | ............. | 382/284 |
| 7,755,812 B2 * | 7/2010 | Oshida et al. | ................ | 358/496 |
| 8,059,313 B2 * | 11/2011 | Nako | ........................... | 358/3.28 |
| 2005/0152003 A1 | 7/2005 | Yokoyama | | |
| 2009/0262390 A1 * | 10/2009 | Tanaka | ........................ | 358/1.15 |

FOREIGN PATENT DOCUMENTS

| | | |
|---|---|---|
| JP | 05-050572 A | 3/1993 |
| JP | 2000-032252 A | 1/2000 |
| JP | 2004222084 A | 8/2004 |
| JP | 2004310383 A | 11/2004 |
| JP | 2005039551 A | 2/2005 |
| JP | 2006042058 A | 2/2006 |

* cited by examiner

*Primary Examiner* — Hilina S Kassa
*Assistant Examiner* — Ashish K Thomas
(74) *Attorney, Agent, or Firm* — Panitch Schwarze Belisario & Nadel LLP

(57) ABSTRACT

An image forming apparatus having a first image obtaining portion which obtains an image of a medium as a first image, a second image obtaining portion which can continuously obtain each image of a plurality of originals as a second image, and an image output section which outputs the image has: an input portion which inputs composition instruction information for instructing composition of first image and each second image; a control portion which makes said first and said second image obtaining portions operative when the composition instruction information is inputted; and an image composing portion which forms each composite image by composing each of the second images sequentially obtained by the second image obtaining portion to the first image obtained by said first image obtaining portion. The image output section outputs the composite images formed by the image composing portion.

20 Claims, 16 Drawing Sheets

FIG. 8
| LAYOUT No. | BASIC IMAGE | SUB - IMAGE | COMPOSITE IMAGE |
|---|---|---|---|
| 1 | 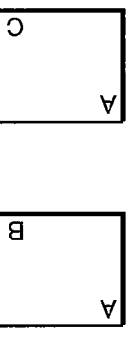 | 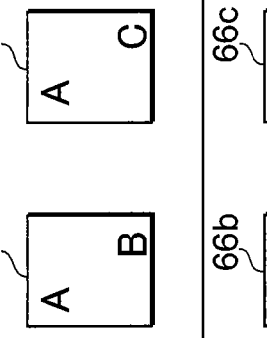 | 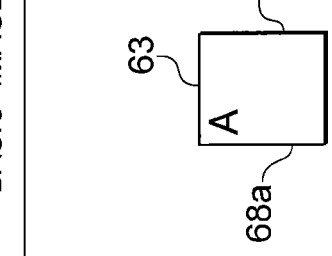 |
| 2 | | | 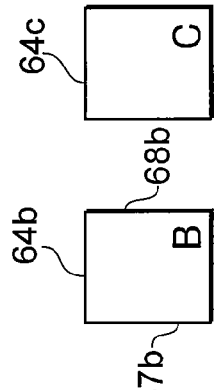 |

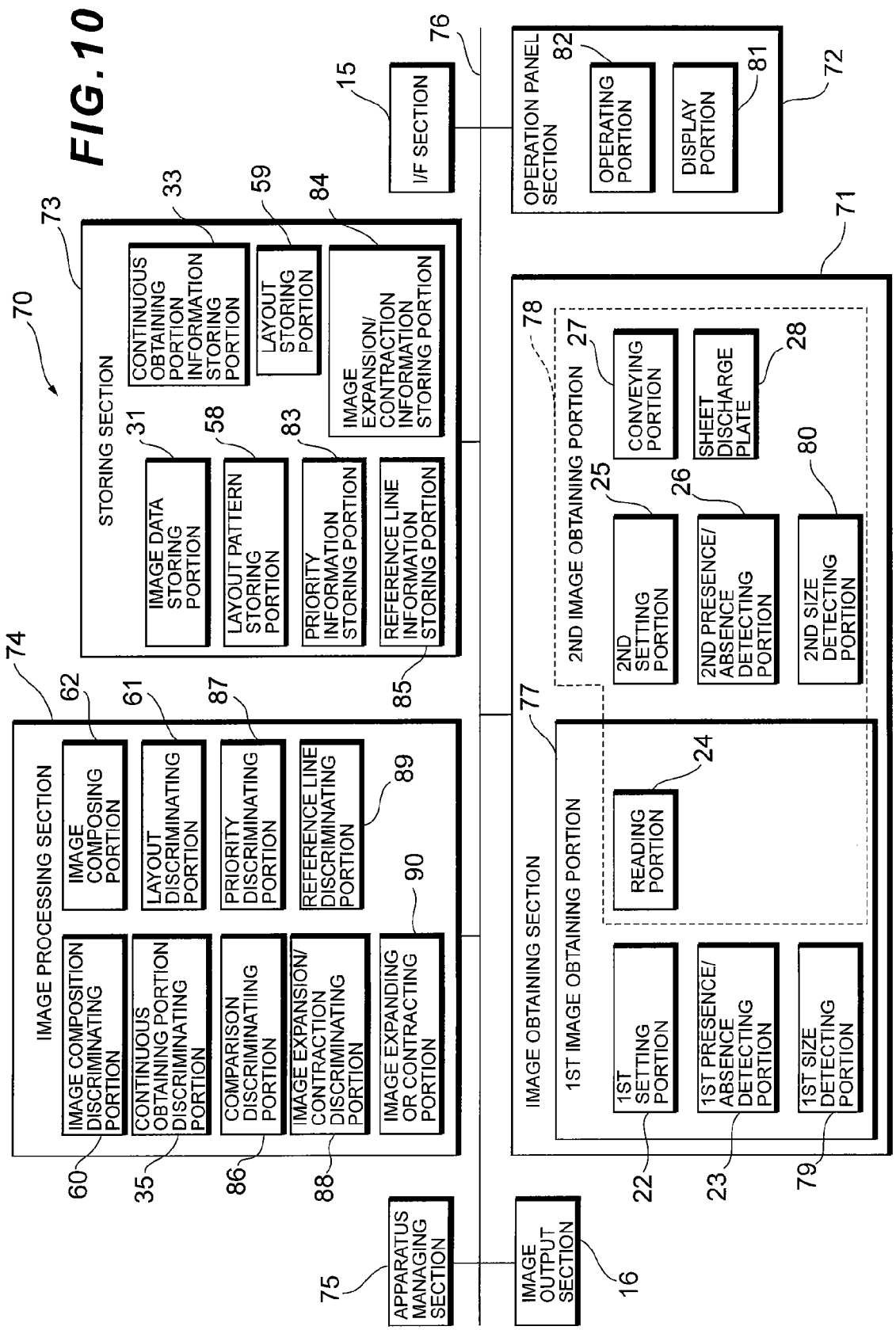

FIG. 11

| LAYOUT No. | BASIC IMAGE | SUB-IMAGE | COMPOSITION CONDITIONS | PRIORITY INFORMATION | IMAGE EXPANSION/ CONTRACTION INFORMATION | COMPOSITION REFERENCE LINE INFORMATION | COMPOSITE IMAGE |
|---|---|---|---|---|---|---|---|
| 1 | AAAA (91, 94a, 95a) | BB (92, 94b, 95b) | a | BASIC IMAGE | EQUAL MAGNIFICATION | START LINE | 93a |
| | | | b | BASIC IMAGE | EQUAL MAGNIFICATION | END LINE | 93b |
| | | | c | BASIC IMAGE | ZOOM | | 93c |
| | EXPANSION/ CONTRACTION BASIC IMAGE (96, AAAA) | EXPANSION/ CONTRACTION SUB-IMAGE (97, BB) | d | SUB-IMAGE | EQUAL MAGNIFICATION | START LINE | 93d |
| | | | e | SUB-IMAGE | EQUAL MAGNIFICATION | END LINE | 93e |
| | | | f | SUB-IMAGE | ZOOM | | 93f |

FIG.15

| EDITION No. | AREA DESIGNATION IMAGE | BASIC IMAGE | EDITION IMAGE | | |
|---|---|---|---|---|---|
| 1 | 115 | 116a | 117-1 | | |
| 2 | | 116b | 117-2 | | |
| 3 | | 116c | 117-3 | | |
| 4 | | | 117-4 | | |
| 5 | | | 117-5 | | |

IMAGE FORMING APPARATUS

BACKGROUND OF THE INVENTION

1. Field of the Invention

The invention relates to an image forming apparatus and, more particularly, to an image forming apparatus for reading a plurality of images and forming a composite image.

2. Description of the Related Art

Hitherto, by using an image forming apparatus having an ADF (Automatic Document Feeder) for sequentially conveying a plurality of original documents, images are read out of the plurality of originals and a composite image obtained by composing the images can be formed onto one sheet of recording paper. In such an image forming apparatus, for example, layout patterns of a plurality of images have previously been stored as samples. The operator sets a plurality of original documents onto the ADF, operates an operation panel, selects creation of a composite image, further, selects a desired layout pattern from the plurality of samples displayed on the operation panel, and presses an execution button. Thus, the image forming apparatus sequentially reads out the originals put on the ADF, obtains the plurality of images, arranges the images on the basis of the selected layout pattern, and forms the composite image. (Refer to JP-A-2005-193559.)

For example, in a business office of a certain enterprise, the case where catalogues of a plurality of new products which are handled by the enterprise have been delivered will be described. The catalogues are printed every new product by using standard-size sheets which can be conveyed by the ADF. A description regarding each new product has been disclosed in the catalogues. Each catalogue is provided with a person-in-charge column showing the person in charge of the business office with respect to each new product. By writing personal information such as name, contact address, and the like of the person in charge in the business office into the person-in-charge column, the catalogues which are used in each business office are completed. However, since it is not permitted to convert the personal information into electronic data due to the enforcement of the personal information protecting law, nothing is printed in the person-in-charge column of the catalogue but the column is blank. Therefore, in each business office, the staff of the business office composes the catalogue and a business card of the person in charge by using the image forming apparatus, thereby completing the catalogue.

In such a case, in order to form the composite image by using the ADF as mentioned above, first, the staff of the business office sets the business card which cannot be conveyed by the ADF onto platen glass and allows the image forming apparatus to read an image of the business card, thereby allowing the composite image to be formed onto a paper medium which can be conveyed by the ADF, that is, a sheet of the same size as that of the catalog. By setting the sheet to the ADF together with the catalog, the composite image can be formed.

In this case, however, since it is necessary to previously form the image (business card) onto the paper medium which can be conveyed by the ADF, consumables such as sheets, toner, and the like are wastefully used. Since the image is further read out and the composite image is formed onto the paper medium, a quality deterioration of the image occurs.

There is also a method whereby the staff of the business office sets the catalogue and the business card onto the platen glass according to a desired layout and allows the image forming apparatus to read the images, thereby allowing the image creation to be performed.

In this case, however, since the staff of the business office has to put the catalogue and the business card onto the platen glass every catalogue, that is, every composite image, it is very annoying.

Therefore, an image forming apparatus which can form a plurality of composite images at a time by composing an arbitrary medium and a plurality of standard-size original documents is demanded.

SUMMARY OF THE INVENTION

It is an object of the invention to provide an image forming apparatus which reads a plurality of images, composes an arbitrary medium and a plurality of standard-size original documents, and can form a plurality of composite images at a time.

According to the present invention, there is provided an image forming apparatus having a first image obtaining portion which obtains an image of a medium as a first image, a second image obtaining portion which can continuously obtain each image of a plurality of media as a second image, and an image output section which outputs the image, comprising:

an input portion which inputs composition instruction information for instructing composition of the first image and each of the second images;

a control portion which makes the first image obtaining portion and the second image obtaining portion operative when the composition instruction information is inputted; and an image composing portion which forms each composite image by composing each of the second images sequentially obtained by the second image obtaining portion to the first image obtained by the first image obtaining portion, wherein the image output section outputs the composite images formed by the image composing portion.

Moreover, the image forming apparatus may further comprise an image storing portion which stores the first image; and a detecting portion which detects whether or not the second images can be further obtained by the second image obtaining portion when the composite images are outputted by the image output section, and wherein if it is detected by the detecting portion that the second images can be obtained, the second image obtaining portion further obtains the second image and the image composing portion further forms the composite image by composing the first image stored in the image storing portion and the second image obtained by the second image obtaining portion.

Moreover, in the image forming apparatus, the image composing portion may form the composite image by overlaying the first image and the second image.

Moreover, the image forming apparatus may further comprise a layout storing portion which stores a layout of the first image and the second image in the composite image, and wherein the image composing portion forms the composite image by arranging the first image and the second image on the basis of the layout stored in the layout storing portion.

Moreover, the image forming apparatus may further comprise a layout pattern storing portion which stores a plurality of layout patterns of the first image and the second image in the composite image; and a selecting portion which allows an operator to select one of the plurality of layout patterns stored in the layout pattern storing portion, and wherein the layout pattern storing portion stores the layout pattern selected by the selecting portion as the layout.

Moreover, in the image forming apparatus, the input portion may further have a priority size detecting portion which inputs priority information for designating one of the first image obtaining portion and the second image obtaining portion as a priority image obtaining portion which obtains a priority image and detects a size of the priority image, and the image composing portion may further form the composite image on the basis of the detected size.

Moreover, in the image forming apparatus, the input portion may further have:

an image expansion/contraction information storing portion which inputs priority information for designating one of the first image obtaining portion or the second image obtaining portion as a priority image obtaining portion which obtains a priority image and designating the other as a sub-image obtaining portion which obtains a sub-image and image expansion/contraction information for instructing to expand or contract the image and stores the image expansion/contraction information;

a priority size detecting portion which detects a size of the priority image;

a sub-image size detecting portion which detects a size of the sub-image;

a comparison discriminating portion which compares the detected size of the priority image with the detected size of the sub-image and discriminates;

an image expansion/contraction discriminating portion which discriminates whether or not the image expansion/contraction information has been stored in the image expansion/contraction information storing portion if it is determined by the comparison discriminating portion that the size of the priority image and the size of the sub-image differ; and an image expanding or contracting portion which expands or contracts the sub-image so as to coincide with the size of the priority image if it is determined by the image expansion/contraction discriminating portion that the image expansion/contraction information has been stored, and wherein the image composing portion forms the composite image by composing the priority image and the expanded or contracted sub-image.

Moreover, in the image forming apparatus, the first image obtaining portion or the second image obtaining portion may comprise a digital camera.

Moreover, in the image forming apparatus, the first image obtaining portion or the second image obtaining portion may comprise an image scanner.

Moreover, in the image forming apparatus, the first image obtaining portion may have a first setting portion which sets the medium; and a reading portion which reads the image of the medium, as the first image, which has been set to the first setting portion.

Moreover, in the image forming apparatus, the first setting portion may comprise a platen glass on which a non-standard-size medium can be set.

Moreover, in the image forming apparatus, the second image obtaining portion may have a second setting portion on which a plurality of standard-size media can be set; a conveying portion which sequentially conveys a plurality of the originals; and a reading portion which can continuously reads images of the plurality of originals, as the second images, which have sequentially been conveyed by the conveying portion.

Moreover, in the image forming apparatus, the conveying portion may comprise an automatic document feeder.

Moreover, in the image forming apparatus, the first image obtaining portion may have a first setting portion which sets the medium and a reading portion which reads the image of the medium, as the first image, which has been set to the first setting portion;

the second image obtaining portion may have a second setting portion on which a plurality of standard-size originals can be set and a conveying portion which sequentially conveys a plurality of the originals to the reading portion;

the reading portion may further read the images of the originals, as the second images, which have sequentially been conveyed by the conveying portion;

the image composing portion may form the composite image by composing the first image and each of the second images; and the image output section may output the composite images.

Moreover, the image forming apparatus may further comprise:

an image storing portion which stores the first image; and a presence/absence detecting portion which detects the presence or absence of the original in the second setting portion when the composite image is outputted by the image output section, and wherein when the presence of the original is detected by the presence/absence detecting portion, the conveying portion further conveys the original to the reading portion, the reading portion further reads the original conveyed by the conveying portion as the second image, and the image composing portion forms the composite image by composing the first image stored in the image storing portion and the second image read by the reading portion.

In the image forming apparatus, the first setting portion may comprise platen glass on which a non-standard-size medium can be set and the conveying portion comprises an automatic document feeder.

Further, according to the present invention, there is provided an image forming apparatus having a first image obtaining portion which obtains an image of a medium as a first image, a second image obtaining portion which can continuously obtain each image of a plurality of media as a second image, and an image output section which outputs the image, comprising:

a first detecting portion which detects whether or not the first image can be obtained by the first image obtaining portion;

a second detecting portion which detects whether or not the second image can be obtained by the second image obtaining portion; and an image composition discriminating portion which discriminates whether or not the first image and the second image are composed on the basis of the detection by the first detecting portion and the detection by the second detecting portion, wherein if it is determined by the image composition discriminating portion that the first image and the second image are composed, the first image obtaining portion obtains the first image and the second image obtaining portion obtains the second image, the apparatus further includes an image composing portion which forms a composite image by composing the obtained first image and the obtained second image, and the image output section outputs the composite image formed by the image composing portion.

Moreover, the image forming apparatus may further comprise a layout pattern storing portion which stores a plurality of layout patterns of the first image and the second image in the composite image; and a selecting portion which allows an operator to select one of the plurality of layout patterns stored in the layout pattern storing portion, and wherein the image composing portion forms the composite image by arranging the first image and the second image on the basis of the selected layout pattern.

Moreover, in the image forming apparatus, the input portion may further have:

an image expansion/contraction information storing portion which inputs priority information for designating one of the first image obtaining portion or the second image obtaining portion as a priority image obtaining portion which obtains a priority image and designating the other as a sub-image obtaining portion which obtains a sub-image and image expansion/contraction information for instructing to expand or contract the image and stores the image expansion/contraction information;

a priority size detecting portion which detects a size of the priority image;

a sub-image size detecting portion which detects a size of the sub-image;

a comparison discriminating portion which compares the detected size of the priority image with the detected size of the sub-image and discriminates;

an image expansion/contraction discriminating portion which discriminates whether or not the image expansion/contraction information has been stored in the image expansion/contraction information storing portion if it is determined by the comparison discriminating portion that the size of the priority image and the size of the sub-image differ; and an image expanding or contracting portion which expands or contracts the sub-image so as to coincide with the size of the priority image if it is determined by the image expansion/contraction discriminating portion that the image expansion/contraction information has been stored, and the image composing portion forms the composite image by composing the priority image and the expanded or contracted sub-image.

Furthermore, according to the present invention, there is provided an image forming apparatus having a first image obtaining portion which obtains an image of a medium as a first image, a second image obtaining portion which obtains the image of the medium as a second image, and an image output section which outputs the image, comprising:

an input portion which inputs image obtaining portion information for designating one of the first image obtaining portion or the second image obtaining portion as an area designation image obtaining portion which obtains an area designation image to designate a specific area and designating the other as a basic image obtaining portion which obtains a basic image and editing instruction information for instructing to edit the basic image on the basis of the area designation image;

a control portion which makes the area designation image obtaining portion and the basic image obtaining portion operative when the editing instruction information is inputted;

an area extracting portion which extracts the specific area from the area designation image obtained by the area designation image obtaining portion; and an image editing portion which overlays the extracted specific area to the basic image obtained by the basic image obtaining portion and edits an image of the specific area, thereby forming an edition image, wherein the image output section outputs the edition image formed by the image editing portion.

According to the image forming apparatus of the invention, since a plurality of composite images can be continuously formed by composing the first image obtained by the first image obtaining portion and a plurality of second images obtained by the second image obtaining portion, respectively, the operability is improved. If the media have been put to the first setting portion of the first image obtaining portion and the second setting portion of the second image obtaining portion, respectively, the composite image is automatically formed, so that the wasteful image creation is suppressed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is an explanatory diagram showing examples of layout patterns;

FIG. 10 is a block diagram of a construction of an embodiment 3 of the image forming apparatus according to the invention;

FIG. 11 is an explanatory diagram showing examples of image composite patterns;

FIG. 15 is an explanatory diagram showing examples of image editing formats.

DETAILED DESCRIPTION OF THE PREFERRED EMBODIMENTS

Embodiments of the invention will be described in detail hereinbelow.

Embodiment 1

Figure 1:
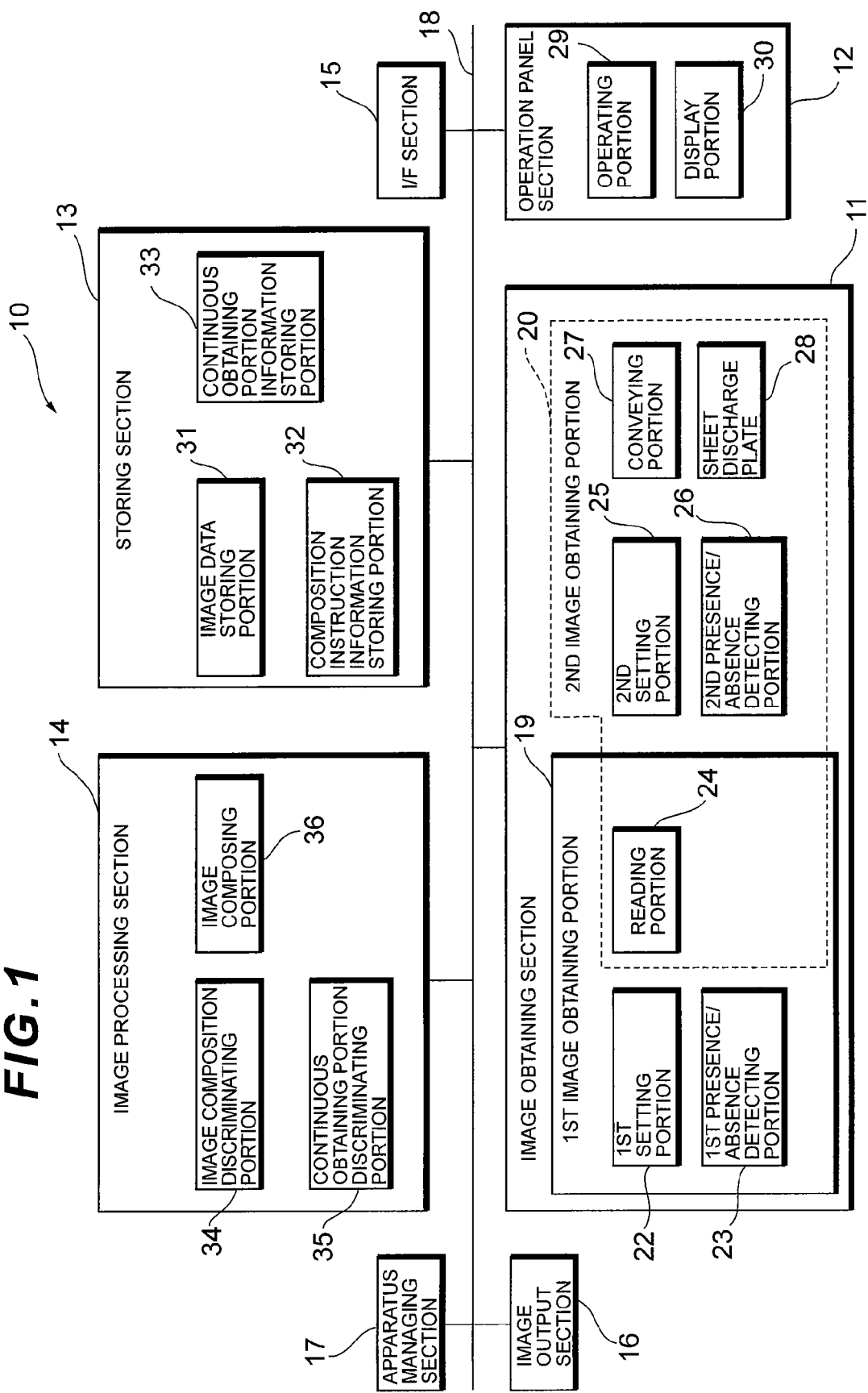
FIG. 1 is a block diagram of a construction of an embodiment 1 of an image forming apparatus according to the invention.
Figure 2:
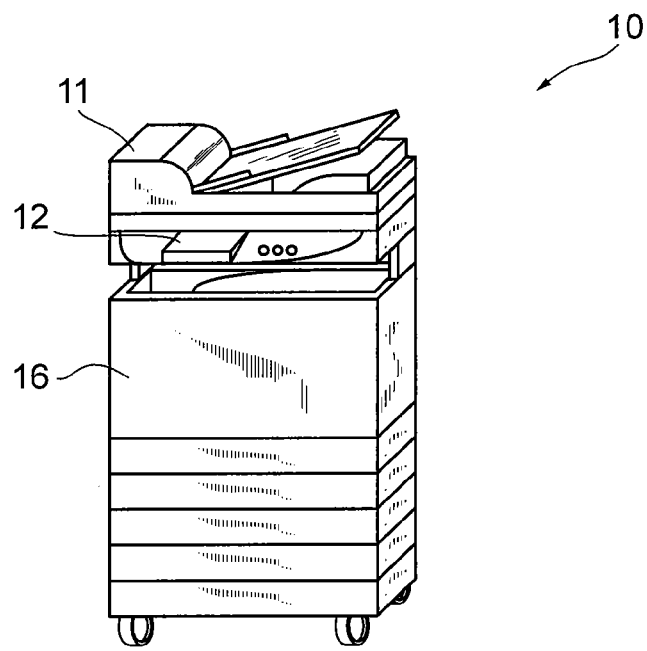
FIG. 2 is a schematic constructional diagram of the image forming apparatus according to the invention.

FIG. 1 is a block diagram of a construction of an embodiment 1 of an image forming apparatus according to the invention. FIG. 2 is a schematic constructional diagram of the image forming apparatus according to the invention. By using an image forming apparatus 10, a plurality of images are read and a composite image can be formed.

As shown in FIG. 1, the image forming apparatus 10 has an image obtaining section 11, an operation panel section 12, a storing section 13, an image processing section 14, an interface (I/F) section 15, an image output section 16, and an apparatus managing section 17. Those sections 11 to 17 are connected through a bus 18.

The image obtaining section 11 has a first image obtaining portion 19 and a second image obtaining portion 20.

Figure 3A:
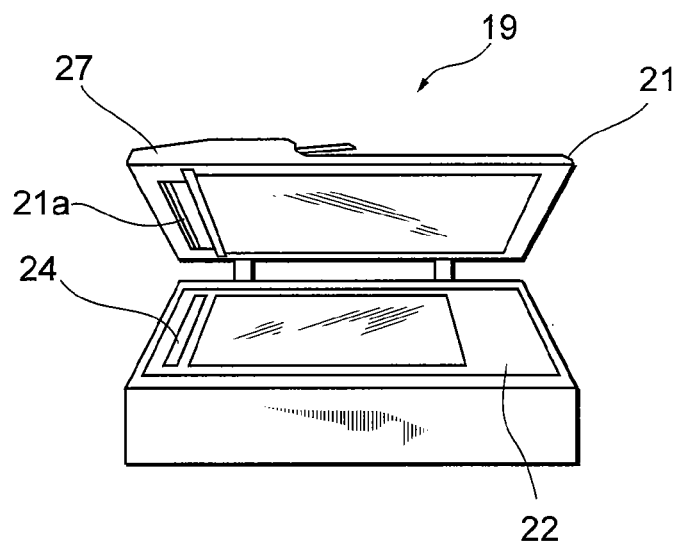
FIGS. 3A and 3B are schematic constructional diagrams showing an example of an image obtaining section.
Figure 3B:
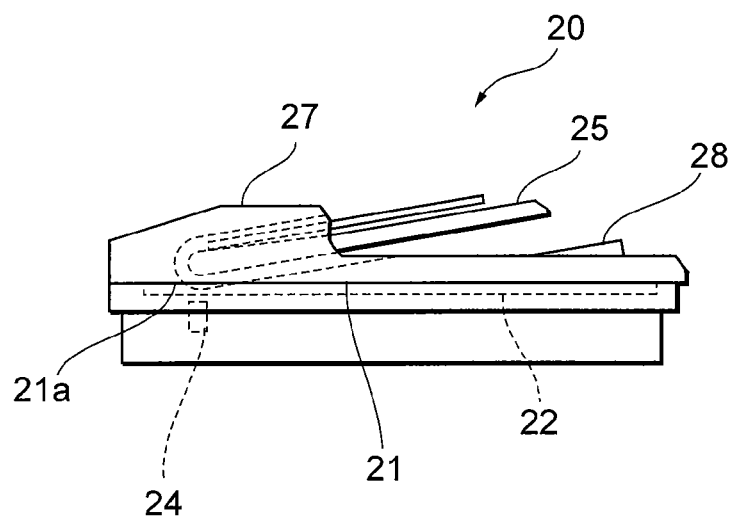

FIGS. 3A and 3B are schematic constructional diagrams showing an example of the image obtaining section.

In the embodiment, as shown in FIGS. 3A and 3B, in the image obtaining section 11, the first image obtaining portion 19 and the second image obtaining portion 20 are provided through an original cover 21, respectively.

As shown in FIG. 3A, the first image obtaining portion 19 is provided under the original cover 21 and has a first setting portion 22, a first presence/absence detecting portion 23, and a reading portion 24.

In the embodiment, the first setting portion 22 is constructed by platen glass and is a setting base plate on which a medium of a non-standard size can be set. Marks showing a range from a reading start line to a reading end line, which will be explained hereinafter, have been made on the side of the reading surface of the platen glass. The medium from which an image is obtained by the first image obtaining portion 19 is disposed so as to face down so that the reading target surface, that is, the reading surface is come into contact with the first setting portion 22.

As a first detecting portion for detecting whether or not the image can be obtained by the first image obtaining portion 19, the first presence/absence detecting portion 23 has a function for detecting the presence or absence of the medium in the first setting portion 22.

The reading portion 24 is constructed by reading sensors each having, for example, an LED, a CCD, or the like and provided under the first setting portion 22. The reading portion 24 has a function for reading the reading target medium set onto the first setting portion 22 so as to face down while moving in parallel from the start line to the end line, which will be explained hereinafter, converting into an electric signal, and thereafter, converting into image data.

The reading sensors for reading the image at intervals of 300 dpi (dots per inch) are arranged in the reading portion 24, thereby reading data of one line at a time.

The reading portion 24 reads the image one line by one each time it moves from the reading start line on the left side of the original toward the original by a distance of $1/300$ inch. By executing such a reading operation to the reading end line on the right side of the original, the reading portion 24 reads the image data of (300 dpi in the vertical direction×300 dpi in the lateral direction) corresponding to one page of the original.

After the end of the reading operation of the first image obtaining portion 19, the reading portion 24 moves to a position under a groove 21a.

As shown in FIG. 3B, the second image obtaining portion 20 is provided over the original cover 21 and has a second setting portion 25, a second presence/absence detecting portion 26, a conveying portion 27, and a sheet discharge plate 28. The second image obtaining portion 20 uses the reading portion 24 in common with the first image obtaining portion 19.

The second setting portion 25 is a setting base plate on which a plurality of standard-size paper media, that is, standard-size originals can be set. In the embodiment, the originals from which images are obtained by the second image obtaining portion 20 are disposed so that the reading surfaces face up.

As a second detecting portion for detecting whether or not the image can be obtained by the second image obtaining portion 20, the second presence/absence detecting portion 26 has a function for detecting the presence or absence of the originals in the second setting portion 25.

In the embodiment, the conveying portion 27 is constructed by the ADF (Automatic Document Feeder) and has a function for sequentially reversing a plurality of originals set onto the second setting portion 25 one by one via the groove 21a formed in the original cover 21 and conveying to the sheet discharge plate 28.

In order to enable the reading portion 24 to read the originals, the groove 21a of the original cover 21 is formed at a position which is on the upper side of the setting position of the reading portion 24 and the first setting portion 22 and which is out of the range between the reading start line and the reading end line of the first image obtaining portion 19.

In the state where the original which has been reversed and conveyed from the second setting portion 25 via the groove 21a of the original cover 21 by the conveying portion 27 is at rest under the groove 21a, the reading portion 24 reads the original line by line from the start line to the end line, which will be explained hereinafter, and converts into the image data.

As mentioned above, the reading sensors for reading the image at the intervals of 300 dpi (dots per inch) are arranged in the reading portion 24, thereby reading the data of one line at a time.

The reading portion 24 reads the image one line by one each time the original moves from the stationary position in the reading portion 24 by the distance of $1/300$ inch by the conveyance of the conveying portion 27. By executing such a reading operation until the original is out of the reading portion 24, the reading portion 24 reads the image data of (300 dpi in the vertical direction×300 dpi in the lateral direction) corresponding to one page of the original.

The sheet discharge plate 28 encloses the original which was conveyed by the conveying portion 27 and from which the image has been read by the reading portion 24.

As shown in FIGS. 1 and 2, the operation panel section 12 has an operating portion 29 and a display portion 30.

The operating portion 29 is constructed by input devices such as touch panel, keyboard, and the like for inputting instructions from the operator and information.

The display portion 30 is constructed by a display device for outputting instructions to the operator from the image forming apparatus 10 and information such as a state and the like of the image forming apparatus 10.

The storing section 13 has an image data storing portion 31, a composition instruction information storing portion 32, and a continuous obtaining portion information storing portion 33.

The image data storing portion 31 is a temporary storing portion for temporarily storing the image data obtained by the first image obtaining portion 19 or the second image obtaining portion 20.

The composition instruction information storing portion 32 is a storing portion for storing composition instruction information for instructing to execute an image composing process. In the embodiment, the composition instruction information is inputted by the operator through the operating portion 29 of the operation panel section 12.

The continuous obtaining portion information storing portion 33 is a storing portion for storing continuous obtaining portion information to designate which one of the first image obtaining portion 19 and the second image obtaining portion 20 is the continuous obtaining portion for continuously obtaining a plurality of images. The continuous obtaining portion information is inputted by the operator through the operating portion 29 of the operation panel section 12 or from an external apparatus (not shown) through the I/F section 15, which will be explained hereinafter. In the embodiment, it is assumed that in the initial state of the image forming apparatus 10, the continuous obtaining portion information stored in the continuous obtaining portion information storing portion 33 has designated the second image obtaining portion 20 as a continuous obtaining portion.

The image processing section 14 has a function for executing a modifying process of the image data obtained by the image obtaining section 11. In the embodiment, the image processing section 14 has an image composition discriminating portion 34, a continuous obtaining portion discriminating portion 35, and an image composing portion 36.

As a control portion for making the first image obtaining portion 19 and the second image obtaining portion 20 operative when the composition instruction information is inputted, the image composition discriminating portion 34 has a function for discriminating whether or not the composition instruction information has been stored in the composition instruction information storing portion 32 of the storing section 13.

The continuous obtaining portion discriminating portion 35 has a function for reading out the continuous obtaining portion information stored in the continuous obtaining portion information storing portion 33 of the storing section 13 and discriminating which one of the first image obtaining portion 19 and the second image obtaining portion 20 is the continuous obtaining portion. The continuous obtaining portion discriminating portion 35 determines that the image obtaining portion which is not the continuous obtaining portion is a basic image obtaining portion for obtaining one image. In the embodiment, in the initial state of the image forming apparatus 10, since the second image obtaining portion 20 is determined to be the continuous obtaining portion, the first image obtaining portion 19 is determined to be the basic image obtaining portion. The image data obtained by the basic image obtaining portion is referred to as a basic image. The image data obtained by the continuous obtaining portion is referred to as a sub-image.

The image composing portion 36 has a function for composing a plurality of images stored in the image data storing portion 31 and forming a composite image. In the embodiment, the image composition by the image composing portion 36 is executed by overlaying two images (for example, colored black data is overlaid to white data). However, the invention is not limited to such a method.

The I/F section 15 has a function for communicating with the external apparatus.

The image output section 16 is constructed by, for example, a printing apparatus of an electrophotographic system and has a function for forming the image data obtained by the image obtaining section 11 or the image data received through the I/F section 15 onto recording paper.

The apparatus managing section 17 has a function for managing the operation and a situation of each of the foregoing sections 11 to 16.

An example of composing a plurality of images by using the image forming apparatus 10 of the embodiment will now be described.

In the embodiment, an example in the case where in a business office of a certain enterprise, the catalogue originals of a plurality of new products which are handled by the enterprise have been delivered will now be described.

Figure 4:
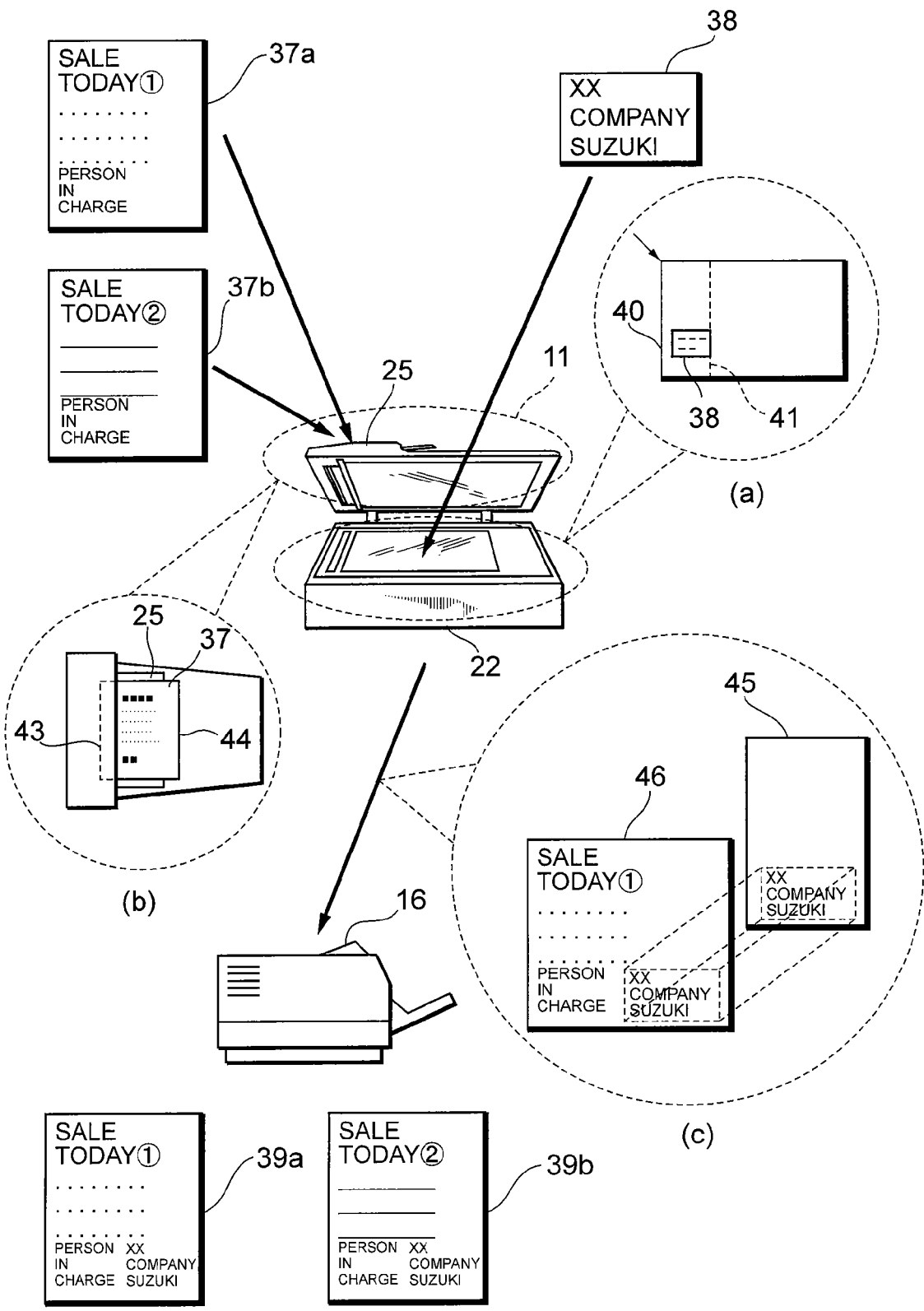
FIG. 4 is an explanatory diagram showing an example of an image composing process by the image forming apparatus of the embodiment 1.

FIG. 4 is an explanatory diagram showing an example of the image composing process by the image forming apparatus of the embodiment 1.

A catalogue original document 37 has been printed every new product by using a plurality of standard-size sheets which can be conveyed by the ADF. In the embodiment, it is assumed that the catalogue original 37 is constructed by a catalogue original document 37*a* of the first sheet and a catalogue original document 37*b* of the second sheet. A person-in-charge column showing the person in charge of the business office is provided in a predetermined lower position of the catalogue original 37. The staff of the business office, that is, the operator copies a business card 38 of the person in charge into the person-in-charge column, thereby completing a catalogue 39 (39*a*, 39*b*).

In the case of completing the catalogue 39, that is, in the case of forming the composite image by composing the catalogue original 37 as a plurality of standard-size paper media which can be conveyed by the ADF and one business card 38 which cannot be conveyed by the ADF as mentioned above, first, the operator sets the business card 38 to a desired position so that the reading surface faces down by using the mark showing the reading range on the first setting portion 22 as a sign ((a) in FIG. 4). The operator also sets a plurality of catalogue originals 37 to the second setting portion 25 so that the reading surface faces up ((b) in FIG. 4).

The operator operates the operating portion 29 of the operation panel section 12 and inputs the composition instruction information. When the composition instruction information is inputted, the inputted composition instruction information is stored into the composition instruction information storing portion 32 of the storing section 13 under the control of the apparatus managing section 17. It is assumed that the continuous obtaining portion information stored in the continuous obtaining portion information storing portion 33 designates that the second image obtaining portion 20 is the continuous obtaining portion and the first image obtaining portion 19 is the basic image obtaining portion.

A flow of the image composing process by the image forming apparatus 10 will now be described with reference to flowcharts.

Figure 5:
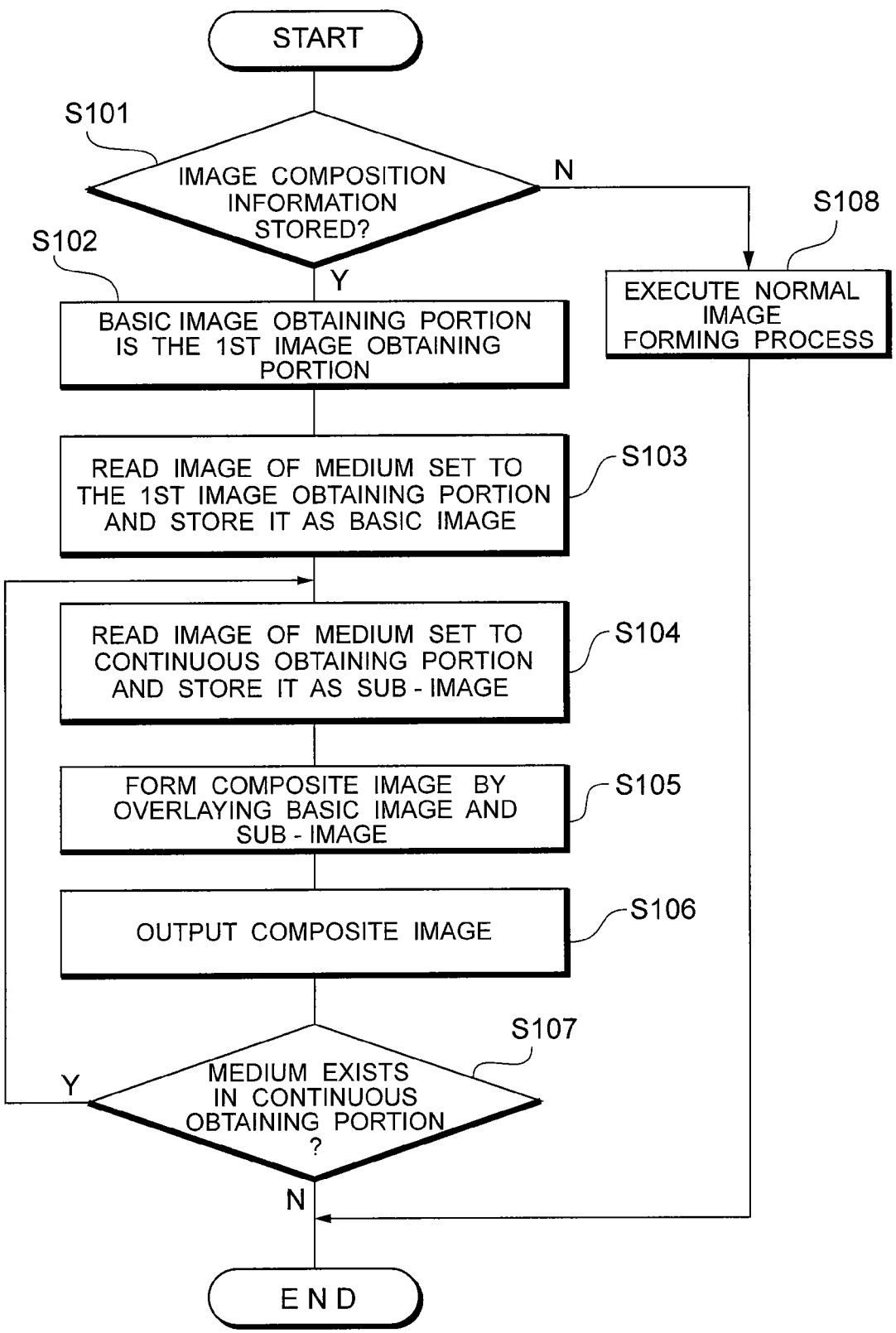
FIG. 5 is a flowchart showing the operation in the embodiment 1 of the image forming apparatus according to the invention.

FIG. 5 is a flowchart showing the operation in the embodiment 1 of the image forming apparatus according to the invention.

First, when a signal showing that the operator has pressed an execution button for instructing the start of the image creation by using the operating portion 29 is inputted to the apparatus managing section 17, the apparatus managing section 17 controls the image composition discriminating portion 34 so as to discriminate whether or not the composition instruction information has been stored in the composition instruction information storing portion 32 (step S101).

If it is determined that the composition instruction information has been stored (S101), the apparatus managing section 17 allows the continuous obtaining portion discriminating portion 35 to read out the continuous obtaining portion information from the continuous obtaining portion information storing portion 33 and to discriminate which one of the first image obtaining portion 19 and the second image obtaining portion 20 is the continuous obtaining portion (S102). In the embodiment, the continuous obtaining portion information stored in the continuous obtaining portion information storing portion 33 indicates that the second image obtaining portion 20 is the continuous obtaining portion. The continuous obtaining portion discriminating portion 35 determines that the first image obtaining portion 19 is the basic image obtaining portion and the second image obtaining portion 20 is the continuous obtaining portion, respectively.

If it is determined in S101 that the composition instruction information is not stored, the apparatus managing section 17 instructs the image forming apparatus 10 to execute the normal printing. The image forming apparatus 10 executes the normal printing (S108).

Subsequently, the apparatus managing section 17 allows the basic image obtaining portion to obtain the image (S103). In the embodiment, since the basic image obtaining portion is the first image obtaining portion 19, in the first image obtaining portion 19, first, the first presence/absence detecting portion 23 detects the presence or absence of the medium in the first setting portion 22. If it is detected that the medium, that is, the business card 38 exists, the reading portion 24 reads the image including the medium set onto the first setting portion 22, that is, the business card 38 and obtains the image data. The image data obtained by the basic image obtaining portion is stored as a basic image into the image data storing portion 31 (S103).

The obtainment of the image of the medium set onto the first setting portion 22 by the reading portion 24 is executed by reading out the image of the set medium line by line while moving in parallel under the first setting portion 22 as mentioned above. In the embodiment, it is assumed that the line on which the reading is started by the reading portion 24 is the start line and the line on which the reading is finished is the end line. In (a) in FIG. 4, positions of a start line 40 and an end line 41 in the case of reading the image of the business card 38 are illustrated on the first setting portion 22. The start line 40 corresponds to an upper portion of the position where the reading portion 24 has been set. In (a) in FIG. 4, the start line 40 is shown at the left edge of the first setting portion 22. The end line 41 corresponds to an upper portion of the position where the reading portion 24 which has been moved in parallel from the lower position of the start line 40 finishes the reading operation of the medium set onto the first setting portion 22. In (a) in FIG. 4, the end line 41 is shown by a broken line on the first setting portion 22.

The apparatus managing section 17 further allows the continuous obtaining portion to obtain the image (S104). In the embodiment, since the continuous obtaining portion is the second image obtaining portion 20, in the second image obtaining portion 20, first, the second presence/absence detecting portion 26 detects the presence or absence of the original in the second setting portion 25. If it is detected that the originals, that is, the catalogue originals 37 exist, the conveying portion 27 conveys the first sheet of original document 37a from the originals set onto the second setting portion 25, that is, a plurality of catalogue originals 37 to the sheet discharge plate 28 via the reading portion 24. The reading portion 24 reads the image of the conveyed first sheet of original document 37a and obtains the image data. The image data obtained by the continuous obtaining portion is stored as a sub-image into the image data storing portion 31 (S104).

The obtainment of the image of the original set onto the second setting portion 25 by the reading portion 24 is executed by reading out the image of the original conveyed by the conveying portion 27 line by line from the start line to the end line while the original is at rest. In (b) in FIG. 4, a start line 43 and an end line 44 in the case of reading the image of the catalogue original 37 are illustrated on the catalogue original 37. In (b) in FIG. 4, the start line 43 corresponds to a left edge of the catalogue original 37 and the end line 44 corresponds to a right edge of the catalogue original 37.

When the basic image and the sub-image are obtained, the apparatus managing section 17 allows the image composing portion 36 to form the composite image (S105). The image composing portion 36 reads out the basic image and the sub-image from the image data storing portion 31 and overlays those two images, thereby forming the composite image ((c) in FIG. 4). The basic image and the sub-image are overlaid every line from a start line 45 side in the basic image and from an end line 46 side in the sub-image and composed. The image data of the formed composite image is stored into the image data storing portion 31 (S105).

Subsequently, the apparatus managing section 17 allows the image output section 16 to output the composite image (S106). The image output section 16 reads out the image data of the composite image stored in the image data storing portion 31 and prints the composite image onto the recording paper. An ejecting portion ejects the recording paper, that is, a catalogue 39a of the first sheet.

Thereafter, the apparatus managing section 17 allows the presence or absence of the medium in the continuous obtaining portion to be detected (S107). In the embodiment, since the continuous obtaining portion is the second image obtaining portion 20, the apparatus managing section 17 allows the second presence/absence detecting portion 26 to detect the presence or absence of the original in the second setting portion 25. If it is detected that the catalogue original 37 exists, the operations of S104 to S107 are repeated and the newly obtained sub-image is composed with the basic image which has already been obtained.

If it is detected in S107 that the medium does not exist in the continuous obtaining portion, the image forming apparatus 10 finishes the processing routine.

As mentioned above, in the embodiment, when the basic image of the business card set onto the first setting portion is obtained, a plurality of composite images are continuously formed by sequentially composing one basic image and the sub-images of a plurality of originals set onto the second setting portion. Therefore, since the images can be automatically composed merely by reading the set business card once, the operability is improved. Since there is no need to preliminarily form the image onto the paper medium which can be conveyed by the ADF, that is, the conveying portion, the wasteful consumption of the consumables and the deterioration of the image quality can be suppressed.

A digital camera or an image scanner can be also used as a first image obtaining portion or a second image obtaining portion.

Figure 6:
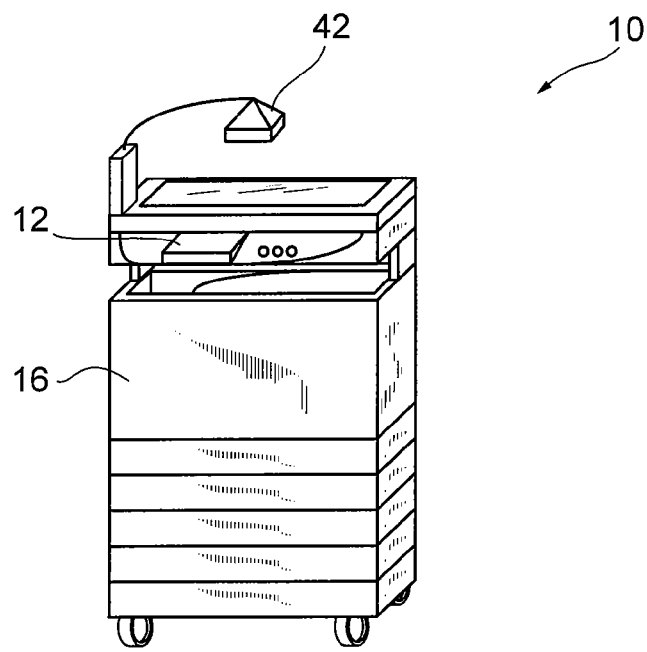
FIG. 6 is a schematic constructional diagram showing a modification of the image forming apparatus according to the invention.

FIG. 6 is a schematic constructional diagram showing a modification of the image forming apparatus according to the invention.

In FIG. 6, a digital camera 42 is connected to the image forming apparatus 10 through the I/F section 15. This digital camera can be also used as a first image obtaining portion or a second image obtaining portion.

For example, in the case of using the digital camera as a second image obtaining portion, a plurality of composite images can be formed by composing the basic image read out of the medium set onto the first setting portion of the first image obtaining portion, that is, onto the platen glass and a plurality of sub-images photographed by the digital camera. Thus, the composite images can be formed without printing the images photographed by the digital camera onto the paper medium.

Embodiment 2

Figure 7:
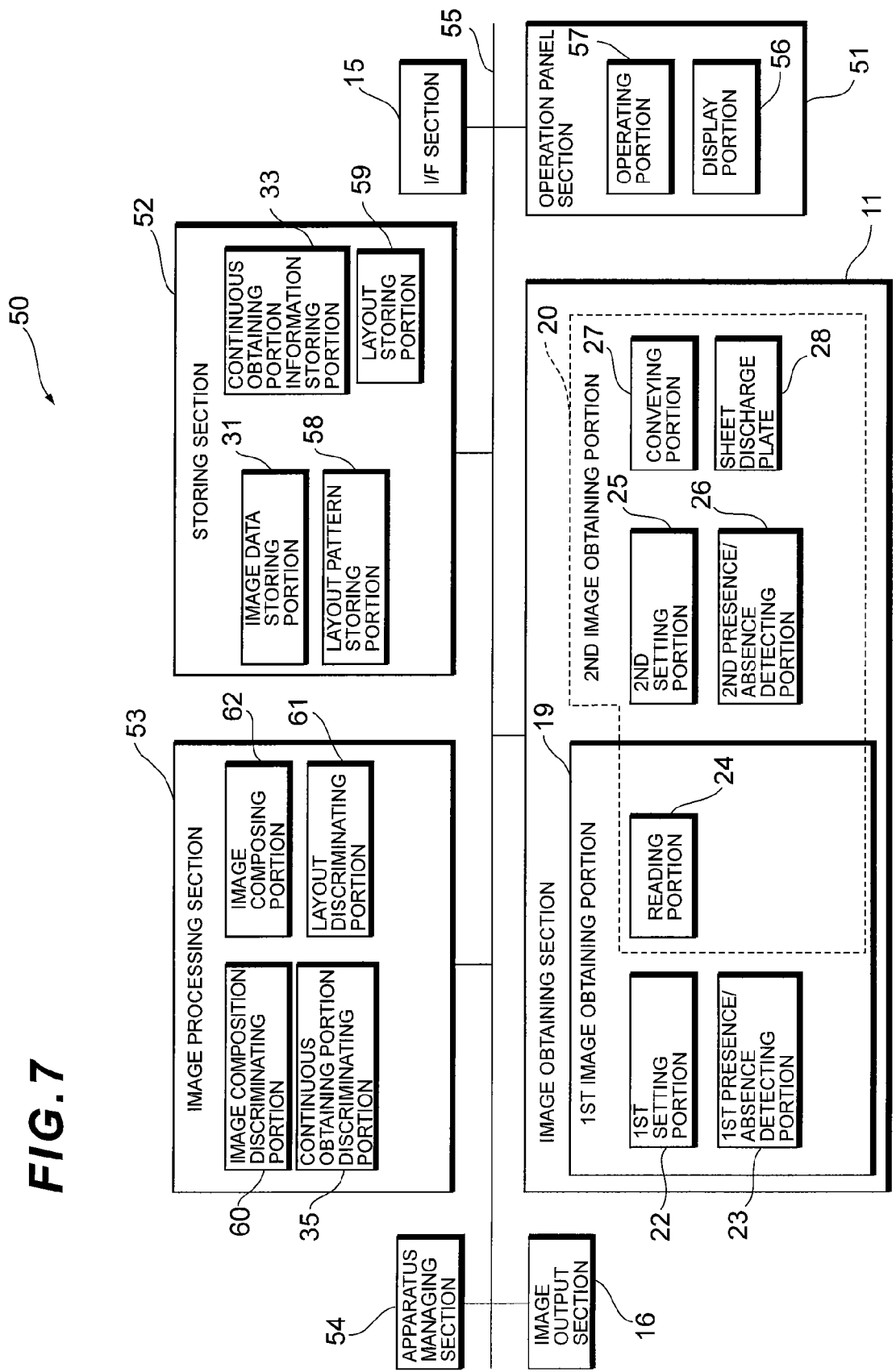
FIG. 7 is a block diagram of a construction of an embodiment 2 of the image forming apparatus according to the invention.

FIG. 7 is a block diagram of a construction of an embodiment 2 of the image forming apparatus according to the invention.

In the embodiment 2, the same or similar component elements as those in the embodiment 1 are designated by the same reference numerals and their description is omitted here.

As shown in FIG. 7, an image forming apparatus 50 has the image obtaining section 11, an operation panel section 51, a storing section 52, an image processing section 53, the interface (I/F) section 15, the image output section 16, and an apparatus managing section 54. Those sections are connected through a bus 55.

The image obtaining section 11 has the first image obtaining portion 19 and the second image obtaining portion 20.

In the embodiment, it is assumed that the first image obtaining portion 19 is the basic image obtaining portion to obtain the basic image and the second image obtaining portion 20 is the continuous obtaining portion to continuously obtain a plurality of sub-images.

The operation panel section 51 has a display portion 56 and an operating portion 57.

The display portion 56 is constructed by a display device and has a function for displaying a plurality of layout patterns stored in a layout pattern storing portion 58, which will be explained hereinafter, to the operator.

The operating portion 57 is constructed by input devices such as touch panel, keyboard, and the like for inputting the instructions from the operator and the information. The operating portion 57 has a function as a selecting portion for allowing the operator to select a desired one of the plurality of layout patterns displayed on the display portion 56. In the embodiment, the selection of the desired layout pattern is performed by inputting a layout number corresponding to the desired layout pattern.

The storing section 52 has the image data storing portion 31, the continuous obtaining portion information storing portion 33, the layout pattern storing portion 58, and a layout storing portion 59.

The layout pattern storing portion 58 is a storing portion for storing the layout pattern of a plurality of images in the composite image.

FIG. 8 is an explanatory diagram showing examples of layout patterns.

In the embodiment, as shown in FIG. 8, two layout patterns corresponding to the layout numbers 1 and 2 have been stored in the layout pattern storing portion 58. In FIG. 8, the following images are illustrated in correspondence to the layout numbers 1 and 2: an image obtained by reading one sheet of original set onto the first setting portion 22 of the first image obtaining portion 19 as a basic image obtaining portion, that is, a basic image 63; two images obtained by reading two sheets of originals set onto the second setting portion 25 of the second image obtaining portion 20 as a continuous obtaining portion, that is, sub-images 64*b* and 64*c*; and two composite images formed after the image composing process.

In a manner similar to the embodiment 1, the layout pattern corresponding to the layout number 1 is obtained by overlaying the two images and composite images 65 are formed from the basic image 63 and sub-images 64.

The layout pattern corresponding to the layout number 2 is a pattern in which two images obtained by "Nup", that is, by contracting the basic image and the sub-images so that their areas are reduced into ½ are rotated and, thereafter, arranged in parallel. Composite images 66 are formed from the basic image 63 and the sub-images 64.

The layout storing portion 59 is a storing portion for storing the layout number of the layout pattern inputted by the operating portion 57.

In the embodiment, the image processing section 53 has an image composition discriminating portion 60, the continuous obtaining portion discriminating portion 35, a layout discriminating portion 61, and an image composing portion 62.

The image composition discriminating portion 60 has a function for discriminating whether or not the image composing process is executed on the basis of the detection result about the presence or absence of the medium in the first setting portion 22 which is detected by the first presence/absence detecting portion 23 of the first image obtaining portion 19 and the detection result about the presence or absence of the original in the second setting portion 25 which is detected by the second presence/absence detecting portion 26 of the second image obtaining portion 20.

The layout discriminating portion 61 has a function for reading out the layout number of the layout pattern stored in the layout storing portion 59 of the storing section 52 and discriminating it.

The image composing portion 62 has a function for forming the composite images by arranging and composing a plurality of images stored in the image data storing portion 31 on the basis of the layout pattern corresponding to the layout number stored in the layout storing portion 59.

An example of composing a plurality of images by using the image forming apparatus 50 of the embodiment will now be described.

First, the operator sets one sheet of original onto the first setting portion 22 and sets a plurality of originals onto the second setting portion 25. The operator operates the operating portion 57 of the operation panel section 51, selects a desired one of the plurality of layout patterns displayed to the display portion 56, and inputs the corresponding layout number. The inputted layout number is stored into the layout storing portion 59.

It is assumed that the continuous obtaining portion information stored in the continuous obtaining portion information storing portion 33 designates that the second image obtaining portion 20 is the continuous obtaining portion and the first image obtaining portion 19 is the basic image obtaining portion.

A flow of the image composing process by the image forming apparatus 50 will now be described with reference to a flowchart.

Figure 9:
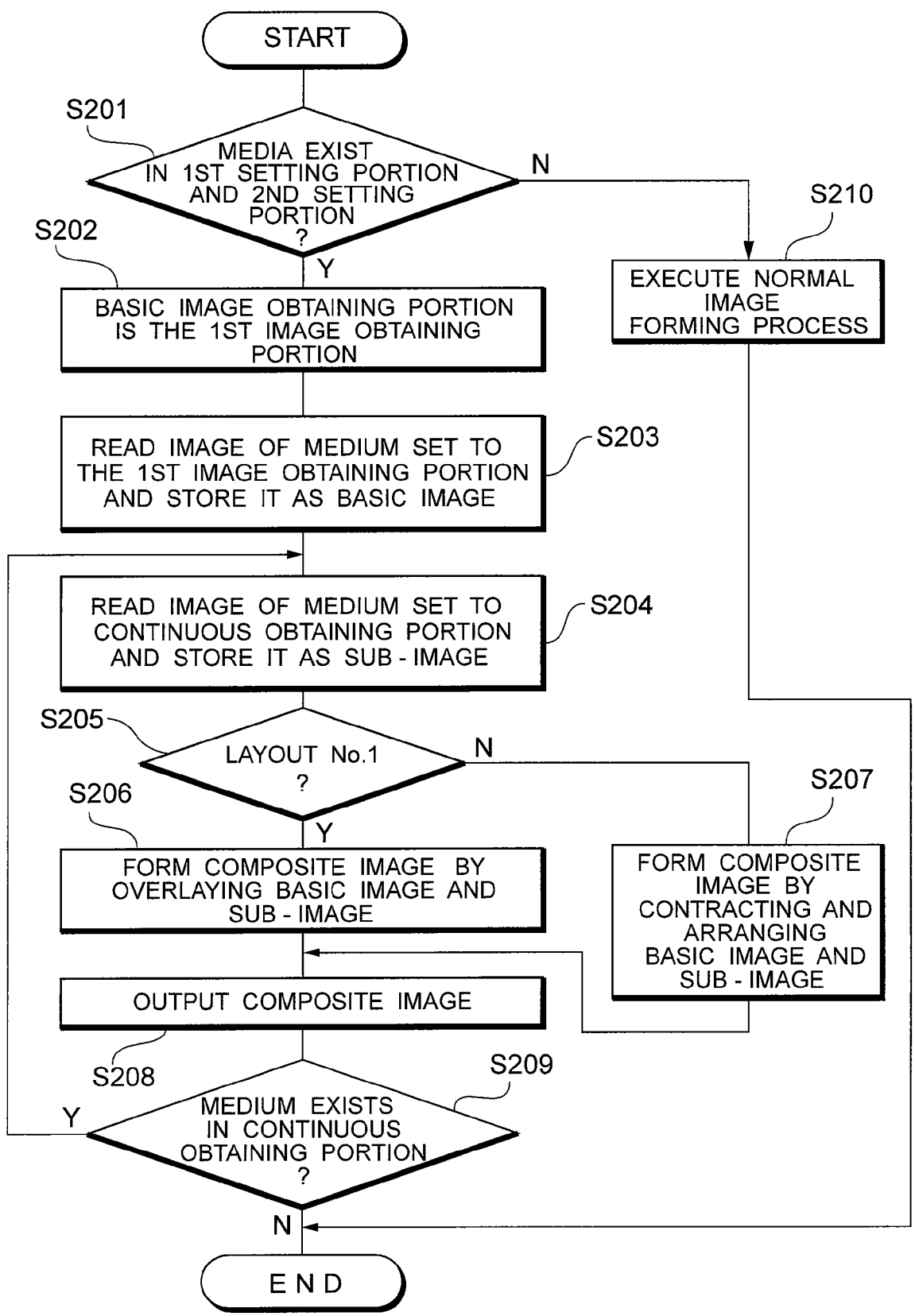
FIG. 9 is a flowchart showing the operation in the embodiment 2 of an image forming apparatus according to the invention.

FIG. 9 is the flowchart showing the operation in the embodiment 2 of an image forming apparatus according to the invention.

First, when the operator presses the execution button for instructing the start of the image creation by using the operating portion 57, the apparatus managing section 54 controls the image composition discriminating portion 60 so as to discriminate whether or not the image composing process is executed (S201). The image composition discriminating portion 60 discriminates the presence or absence of the original in the first setting portion 22 and the original in the second setting portion 25 on the basis of the detection result by the first presence/absence detecting portion 23 of the first image obtaining portion 19 and the detection result by the second presence/absence detecting portion 26 of the second image obtaining portion 20. If it is determined that the originals exist in both of them, it is decided that the image composing process is executed (S201).

If it is determined that the original does not exist in either the first setting portion 22 or the second setting portion 25, the image composition discriminating portion 60 determines that the image composing process is not executed (S201). The image forming apparatus 50 executes the normal image composing process (S210).

If it is determined that the image composing process is executed (S201), the apparatus managing section 54 allows the continuous obtaining portion discriminating portion 35 to read out the continuous obtaining portion information from the continuous obtaining portion information storing portion 33 and to discriminate which one of the first image obtaining portion 19 and the second image obtaining portion 20 is the continuous obtaining portion (S202). In the embodiment, the continuous obtaining portion information stored in the continuous obtaining portion information storing portion 33 indicates that the second image obtaining portion 20 is the continuous obtaining portion. The continuous obtaining portion discriminating portion 35 determines that the first image obtaining portion 19 is the basic image obtaining portion and the second image obtaining portion 20 is the continuous obtaining portion, respectively (S202).

Subsequently, the apparatus managing section 54 allows the basic image obtaining portion to obtain the image (S203). In the embodiment, since the basic image obtaining portion is the first image obtaining portion 19, the reading portion 24 reads the image of the original set onto the first setting portion 22 from a start line 67a to an end line 68a, thereby obtaining the image data. The obtained image data is stored as a basic image 63 into the image data storing portion 31 (S203).

Further, the apparatus managing section 54 allows the continuous obtaining portion to obtain the image (S204). In the embodiment, since the continuous obtaining portion is the second image obtaining portion 20, the conveying portion 27 conveys the first one of a plurality of originals set onto the second setting portion 25 to the sheet discharge plate 28 via the reading portion 24. The reading portion 24 reads the image of the conveyed original from a start line 67b to an end line 68b, thereby obtaining the image data. The obtained image data is stored as a sub-image 64b into the image data storing portion 31 (S204).

When the basic image 63 and the sub-image 64b are obtained, the apparatus managing section 54 allows the layout discriminating portion 61 to read out the layout number stored in the layout storing portion 59 (S205).

If it is determined that the layout number is equal to 1 (S205), the apparatus managing section 54 allows the image composing portion 62 to form the composite image based on the layout pattern corresponding to the layout number 1 (S206). That is, the image composing portion 62 overlays the basic image 63 and the sub-image 64b stored in the image data storing portion 31 every line from the start line 67a side of the basic image 63 and from the end line 68b side of the sub-image 64b, thereby forming a composite image 65b. The formed composite image 65 is stored into the image data storing portion 31 (S206).

If it is determined that the layout number is equal to 2 (S205), the apparatus managing section 54 allows the image composing portion 62 to form the composite image based on the layout pattern corresponding to the layout number 2 (S207). That is, the image composing portion 62 contracts the basic image 63 and the sub-image 64b stored in the image data storing portion 31 so that their areas are reduced into ½, rotates them, and arranges them so that the start line 67a of the basic image 63 and the end line 68b of the sub-image 64b overlap, thereby forming a composite image 66b. The formed composite image 66 is stored into the image data storing portion 31 (S207).

Subsequently, the apparatus managing section 54 allows the image output section 16 to print the composite image stored in the image data storing portion 31 onto the recording paper and allows the ejecting portion to eject the recording paper (S208).

After that, the apparatus managing section 54 allows the presence or absence of the next medium in the continuous obtaining portion to be detected (S209). In the embodiment, since the continuous obtaining portion is the second image obtaining portion 20, the apparatus managing section 54 allows the second presence/absence detecting portion 26 to detect the presence or absence of the next original in the second setting portion 25. If the presence of the original is detected, the operations of S204 to S209 are repeated.

If the absence of the medium in the continuous obtaining portion is detected in S209, the image forming apparatus 50 finishes the processing routine.

As mentioned above, in the embodiment, whether or not the medium has been set to each of the first setting portion and the second setting portion is discriminated. If it is determined that the medium has been set, the composite image is automatically formed. Therefore, there is no need to make the composition setting of the images prior to forming the image. The operation is simplified. The wasteful image creation and consumption of the consumables can be suppressed. By preliminarily storing a plurality of layout patterns and allowing the operator to select a desired one of the plurality of layout patterns, a using range is further widened and the use convenience is improved.

Embodiment 3

FIG. 10 is a block diagram showing a construction of an embodiment 3 of the image forming apparatus according to the invention.

In the embodiment 3, the same or similar component elements as those in the embodiment 1 or 2 are designated by the same reference numerals and their description is omitted here.

As shown in FIG. 10, an image forming apparatus 70 has an image obtaining section 71, an operation panel section 72, a storing section 73, an image processing section 74, the interface (I/F) section 15, the image output section 16, and an apparatus managing section 75. Those sections are connected through a bus 76.

The image obtaining section 71 has a first image obtaining portion 77 and a second image obtaining portion 78.

The first image obtaining portion 77 has the first setting portion 22, the first presence/absence detecting portion 23, a first size detecting portion 79, and the reading portion 24.

The first size detecting portion 79 has a function for detecting an area, that is, a size of the image obtained by the first image obtaining portion 77. For example, a material of the original cover 21 is selected (for example, the color is changed) in such a manner that a reflectance of the original medium in the first setting portion 22 and a reflectance of the original cover 21 arranged on the reverse side of the original medium are set to different values. The first size detecting portion 79 calculates the range of the image area from a difference between the reflectance values of the original medium and the original cover 21.

The second image obtaining portion 78 has the second setting portion 25, the second presence/absence detecting portion 26, a second size detecting portion 80, the conveying portion 27, the reading portion 24, and the sheet discharge plate 28.

The second size detecting portion 80 has a function for detecting a size of the image obtained by the second image obtaining portion 78. For example, the material of the original cover 21 is selected (for example, the color is changed) in such a manner that a reflectance of the original medium in the second setting portion 25 and that of the original cover 21 arranged on the reverse side of the original medium are set to different values. The second size detecting portion 80 calculates the range of the image area from a difference between the reflectance values of the original medium and the original cover 21.

The operation panel section 72 has a display portion 81 and an operating portion 82.

The display portion 81 is constructed by a display device and has a function for displaying the layout patterns stored in the layout pattern storing portion 58 and the sizes and the like of the medium and the original detected by the first size detecting portion 79 and the second size detecting portion 80 to the operator.

The operating portion 82 is constructed by input devices such as touch panel, keyboard, and the like for inputting the instructions from the operator and the information. The operating portion 82 has a function as a selecting portion and an input portion for allowing the operator to select and input the layout number of a desired layout pattern, image expansion/contraction information, which will be explained hereinafter, and the like.

The storing section 73 has the image data storing portion 31, the continuous obtaining portion information storing portion 33, the layout pattern storing portion 58, the layout storing portion 59, a priority information storing portion 83, an image expansion/contraction information storing portion 84, and a reference line information storing portion 85.

The priority information storing portion 83 is a storing portion for storing priority information to designate which one of the first image obtaining portion 77 and the second image obtaining portion 78 is the priority obtaining portion. This priority information is used to decide the size of composite image which is formed by the image composing portion 62. The image size obtained by the priority obtaining portion becomes the composite image size.

The image expansion/contraction information storing portion 84 is a storing portion for storing image expansion/contraction information showing whether or not the expansion or contraction of the image is executed in the image composing process when the size of basic image which is obtained by the basic image obtaining portion and that of the sub-image which is obtained by the continuous obtaining portion differ. When the image expansion or contraction is not executed, the image expansion/contraction information is direct-copy (equal magnification) information. When the image expansion or contraction is executed, the image expansion/contraction information is zoom (variable magnification) information.

The reference line information storing portion 85 is a storing portion for storing reference line information indicative of a composition reference line in the image composing process. The reference line information is used in the case where the size of the basic image and that of the sub-image differ and the image expansion/contraction information stored in the image expansion/contraction information storing portion 84 is the zoom information. When the composition reference line is the start line, the reference line information is start line information. When the composition reference line is the end line, the reference line information is end line information.

The foregoing priority information, image expansion/contraction information, and reference line information are inputted by the operator through the operating portion 82 of the operation panel section 72 or from the external apparatus (not shown) through the I/F section 15.

The image processing section 74 has the image composition discriminating portion 60, the continuous obtaining portion discriminating portion 35, the layout discriminating portion 61, a comparison discriminating portion 86, a priority discriminating portion 87, an image expansion/contraction discriminating portion 88, and a reference line discriminating portion 89, an image expanding or contracting portion 90, and the image composing portion 62.

The comparison discriminating portion 86 has a function for comparing the sizes of the basic image and the sub-image detected by the first size detecting portion 79 and the second size detecting portion 80 and discriminating.

The priority discriminating portion 87 has a function for reading out the priority information stored in the priority information storing portion 83 in the storing section 73 and discriminating which one of the first image obtaining portion 77 and the second image obtaining portion 78 is the priority obtaining portion.

The image expansion/contraction discriminating portion 88 has a function for discriminating whether or not the image expansion/contraction is executed on the basis of the image expansion/contraction information stored in the image expansion/contraction information storing portion 84 in the storing section 73 if it is determined by the comparison discriminating portion 86 that the sizes of the basic image and the sub-image differ. The image expansion/contraction discriminating portion 88 also has a function for determining an expanding/contracting magnification of the image on the basis of the sizes of the basic image and the sub-image detected by the first size detecting portion 79 and the second size detecting portion 80 so that the sizes of the basic image and the sub-image are equalized if it is determined that the image expansion/contraction is executed, that is, when the stored image expansion/contraction information is the zoom information.

The reference line discriminating portion 89 has a function for reading out the reference line information stored in the reference line information storing portion 85 in the storing section 73 and discriminating whether the composition reference line is either the start line or the end line.

The image expanding or contracting portion 90 has a function for expanding or contracting the basic image or the sub-image on the basis of the expanding/contracting magnification decided by the image expansion/contraction discriminating portion 88 so that the size of the basic image or the sub-image coincides with the image size obtained by the priority obtaining portion decided by the priority discriminating portion 87.

Examples of the composition of a plurality of images which is executed by using the image forming apparatus 70 in the embodiment will now be described.

FIG. 11 is an explanatory diagram showing examples of image composite patterns.

FIG. 11 illustrates the followings with respect to the case of the layout corresponding to the layout number 1, that is, the overlap of the basic image and the sub-image: an image, that is, a basic image 91 obtained by reading the original set onto the basic image obtaining portion; an image, that is, a sub-image 92 obtained by reading the original set onto the continuous image obtaining portion; composition conditions in the case where the size of basic image and the size of sub-image differ; and each of composite images 93 formed after the execution of the image composing process according to the composition conditions. The composition conditions include the priority information, image expansion/contraction information, and reference line information stored in the storing section 73.

Although the size of basic image 91 is twice as large as that of the sub-image 92 in the examples shown in FIG. 11, the invention is not limited to such a size. Layout numbers 2, . . . are added to other composite patterns, respectively.

Prior to executing the image composing process, first, the operator sets one sheet of original onto the first setting portion 22 and sets a plurality of originals onto the second setting portion 25. In the embodiment, it is assumed that the size of each original set onto the second setting portion 25 is equal to ½ of that of the original set onto the first setting portion 22.

The operator operates the operating portion 82 of the operation panel section 72 and selects a desired one of a plurality of layout patterns displayed on the display portion 81 and inputs the corresponding layout number. The inputted layout number is stored into the layout storing portion 59. In the embodiment, it is assumed that the layout No. 1 has been inputted as a desired layout pattern. Further, the operator inputs the priority information, image expansion/contraction information, reference line information, and the like by operating the operating portion 82.

It is assumed that the continuous obtaining portion information stored in the continuous obtaining portion information storing portion 33 designates that the second image obtaining portion 78 is the continuous obtaining portion and the first image obtaining portion 77 is the basic image obtaining portion.

A flow of the image composing process which is executed by the image forming apparatus 70 will now be described with reference to flowcharts.

Figure 12A:
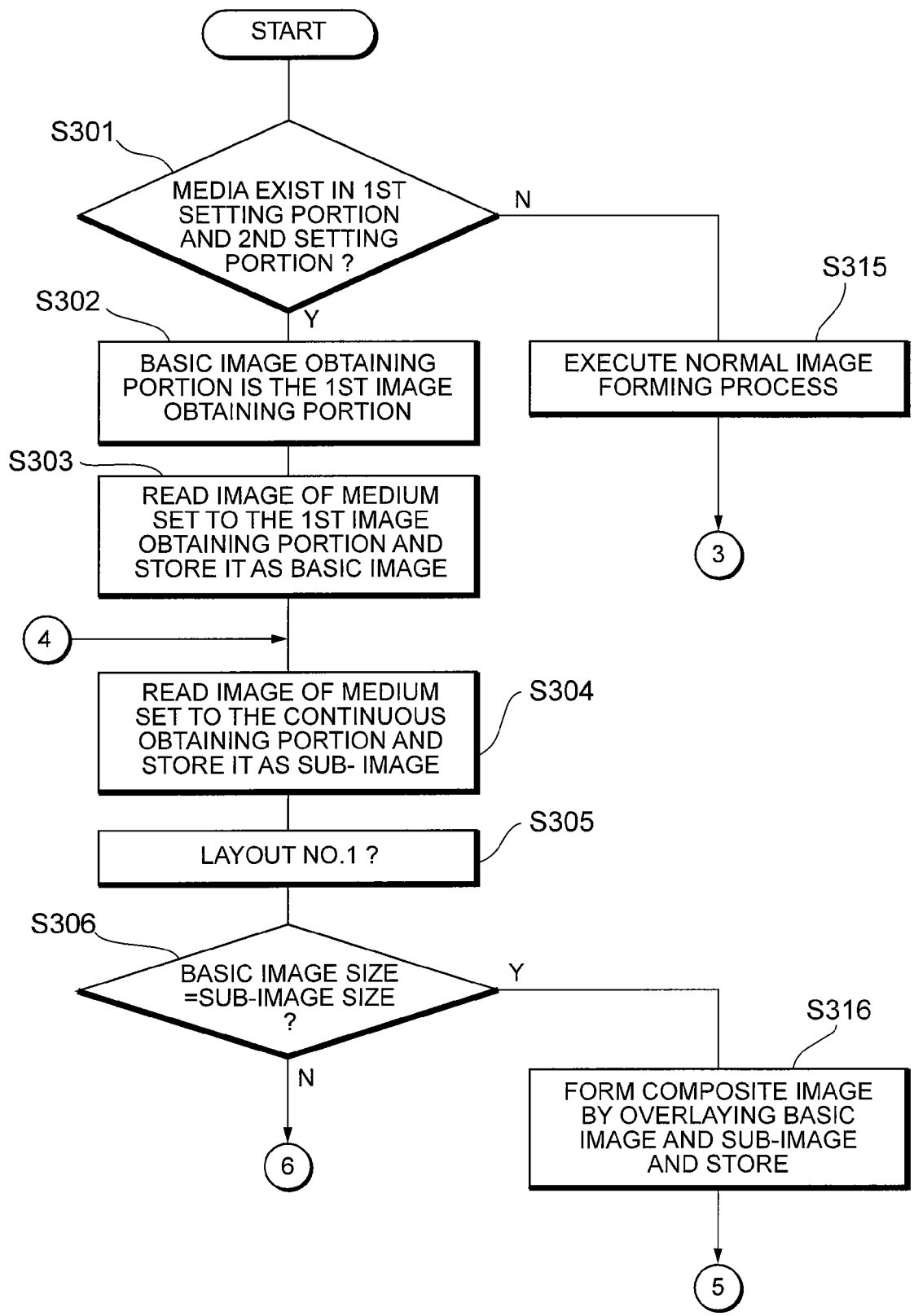
FIG. 12 is a flowchart (part 1) showing the operation in the embodiment 3 of an image forming apparatus according to the invention.
Figure 12B:
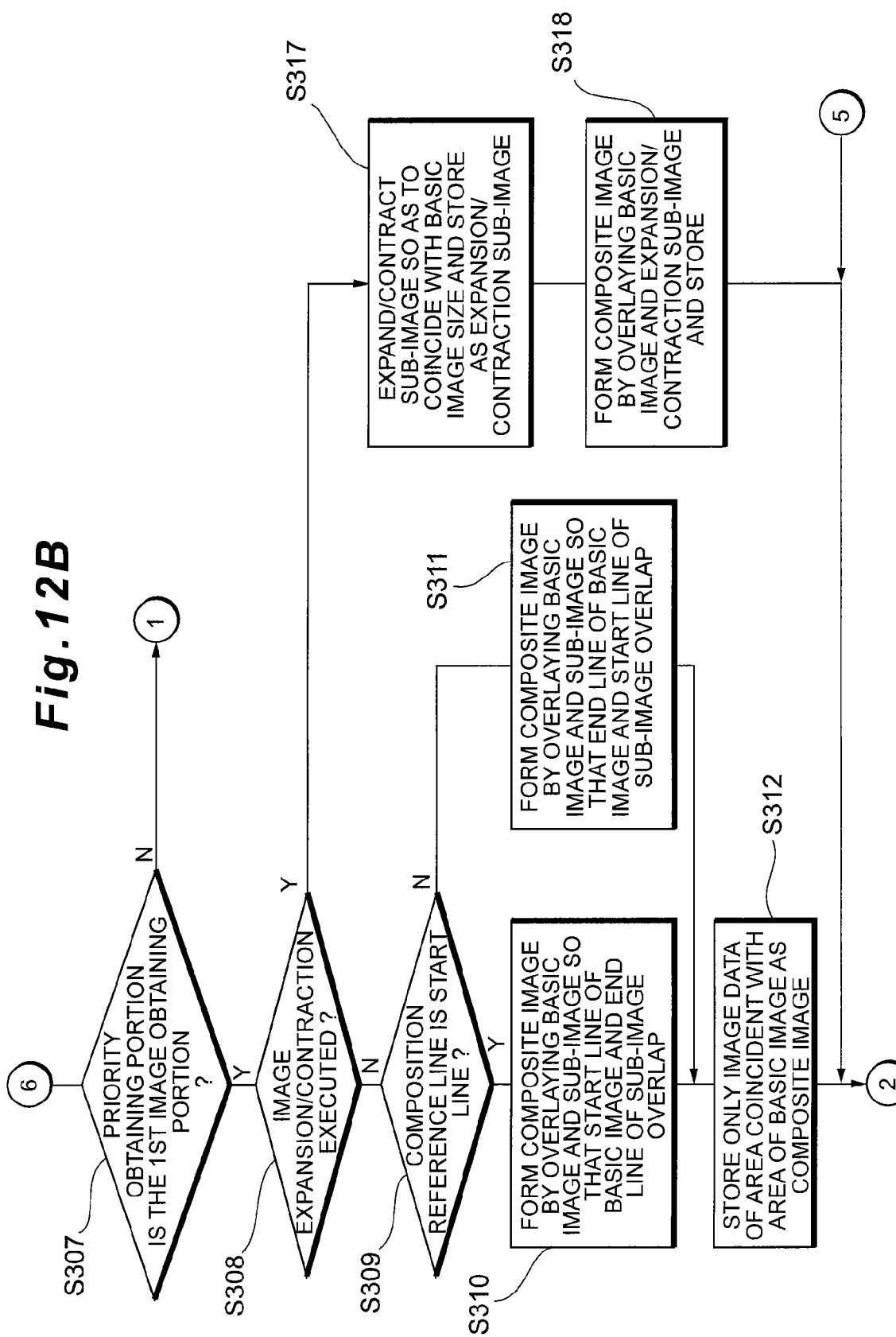
Figure 13:
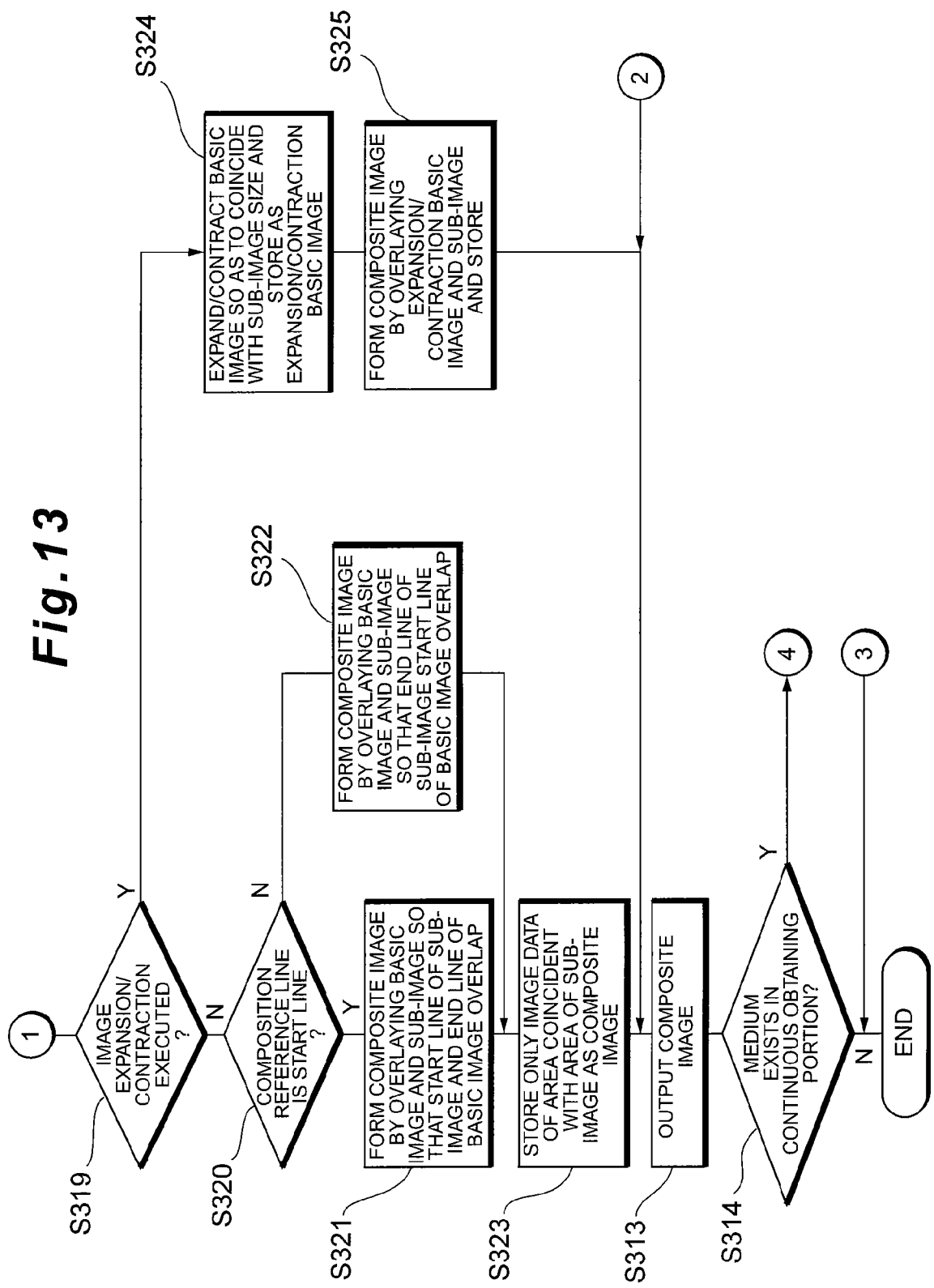
FIG. 13 is a flowchart (part 2) showing the operation in the embodiment 3 of the image forming apparatus according to the invention.

FIG. 12 is the flowchart (part 1) showing the operation in the embodiment 3 of an image forming apparatus according to the invention. FIG. 13 is the flowchart (part 2) showing the operation in the embodiment 3 of the image forming apparatus according to the invention.

First, the flow of the image composing process in the case where the priority obtaining portion designated by the priority information is the basic image obtaining portion and the image expansion/contraction information is the direct-copy (equal magnification) information, that is, if the image expansion/contraction is not executed (composition conditions a and b in FIG. 11) will be described.

First, when the operator presses the execution button for instructing the start of the image creation by using the operating portion 82, the apparatus managing section 75 controls the image composition discriminating portion 60 so as to discriminate whether or not the image composing process is executed (S301). The image composition discriminating portion 60 discriminates the presence or absence of the originals in the first setting portion 22 and the second setting portion 25 on the basis of the detection result obtained by the first presence/absence detecting portion 23 of the first image obtaining portion 77 and the detection result obtained by the second presence/absence detecting portion 26 of the second image obtaining portion 78. If it is determined that the originals exist in both of them, the image composition discriminating portion 60 determines that the image composing process is executed (S301).

If it is determined that the original does not exist in either the first setting portion 22 or the second setting portion 25, the image composition discriminating portion 60 determines that the image composing process is not executed (S301). The image forming apparatus 70 executes the normal image forming process (S315).

If it is determined that the image composing process is executed (S301), the apparatus managing section 75 allows the continuous obtaining portion discriminating portion 35 to read out the continuous obtaining portion information from the continuous obtaining portion information storing portion 33 and to discriminate which one of the first image obtaining portion 77 and the second image obtaining portion 78 is the continuous obtaining portion (S302). In the embodiment, the continuous obtaining portion information stored in the continuous obtaining portion information storing portion 33 indicates that the second image obtaining portion 78 is the continuous obtaining portion. The continuous obtaining portion discriminating portion 35 determines that the first image obtaining portion 77 is the basic image obtaining portion and the second image obtaining portion 78 is the continuous obtaining portion, respectively (S302).

Subsequently, the apparatus managing section 75 allows the basic image obtaining portion to obtain the image (S303). In the embodiment, since the basic image obtaining portion is the first image obtaining portion 77, the reading portion 24 reads the image of the original set onto the first setting portion 22 from a start line 94a to an end line 95a, thereby obtaining the image data. The first size detecting portion 79 detects the size of the obtained image data. The obtained image data is stored as a basic image 91 into the image data storing portion 31 (S303).

Further, the apparatus managing section 75 allows the continuous obtaining portion to obtain the image (S304). In the embodiment, since the continuous obtaining portion is the second image obtaining portion 78, the conveying portion 27 conveys the first one of a plurality of originals set onto the second setting portion 25 to the sheet discharge plate 28 via the reading portion 24. The reading portion 24 reads the image of the conveyed original from a start line 94b to an end line 95b, thereby obtaining the image data. The second size detecting portion 80 detects the size of the obtained image data. The obtained image data is stored as a sub-image 92 into the image data storing portion 31 (S304).

When the basic image 91 and the sub-image 92 are obtained, the apparatus managing section 75 allows the layout discriminating portion 61 to read out the layout number stored in the layout storing portion 59 (S305). In the embodiment, the layout number stored in the layout storing portion 59 is 1.

Subsequently, the apparatus managing section 75 allows the comparison discriminating portion 86 to compare the size of basic image 91 with that of the sub-image 92 (S306). On the basis of the sizes detected by the first size detecting portion 79 and the second size detecting portion 80, the comparison discriminating portion 86 discriminates whether or not the size of basic image 91 and that of the sub-image 92 differ.

If it is determined that the sizes of the basic image 91 and the sub-image 92 differ (S306), the apparatus managing section 75 allows the priority discriminating portion 87 to read out the priority information from the priority information storing portion 83 and to discriminate which one of the first image obtaining portion 77 and the second image obtaining portion 78 is the priority obtaining portion (S307).

If it is determined that the priority obtaining portion is the basic image obtaining portion, that is, the first image obtaining portion 77 (S307), the apparatus managing section 75 allows the image expansion/contraction discriminating portion 88 to discriminate whether or not the image expansion/contraction is executed (S308). The image expansion/contraction discriminating portion 88 reads out the image expansion/contraction information stored in the image expansion/contraction information storing portion 84. If the read-out image expansion/contraction information is the equal magnification information, the image expansion/contraction discriminating portion 88 determines that the image expansion/contraction is not executed, and if it is the zoom information, it is determined that the image expansion/contraction is executed (S308).

If it is determined that the image expansion/contraction is not executed (S308), the apparatus managing section 75 allows the reference line discriminating portion 89 to discriminate the composition reference line (S309). The reference line discriminating portion 89 reads out the reference line information stored in the reference line information storing portion 85. If the read-out reference line information is the start line information (composition conditions a in FIG. 11), it is determined that the composition reference line is the start line of the priority image and, if it is the end line information (composition conditions b in FIG. 11), it is determined that the composition reference line is the end line of the priority image (S309).

If it is determined that the composition reference line is the start line (S309), the apparatus managing section 75 allows the image composing portion 62 to form the composite image based on the layout pattern corresponding to the layout number 1 by using a start line 94 of the priority image as a composition reference line (S310). That is, the image composing portion 62 overlays the basic image 91 and the sub-image 92 stored in the image data storing portion 31 so that the end line 95b of the sub-image 92 overlaps the start line 94a of the basic image 91 by using the start line 94a of the priority image, that is, the basic image 91 as a reference, thereby forming a composite image 93a (S310).

If it is determined that the composition reference line is the end line (S309), the apparatus managing section 75 allows the image composing portion 62 to form the composite image based on the layout pattern corresponding to the layout number 1 by using an end line 95 of the priority image as a composition reference line (S311). That is, the image composing portion 62 overlays the basic image 91 and the sub-image 92 stored in the image data storing portion 31 so that the start line 94b of the sub-image 92 overlaps the end line 95a of the basic image 91 by using the end line 95a of the priority image, that is, the basic image 91 as a reference, thereby forming a composite image 93b (S311).

In the formed composite images 93a and 93b, the image obtained by the priority obtaining portion, that is, the image data of an area out of the area of the basic image 91 is deleted and only the image data of an area which coincides with the area of the basic image 91 is stored as a composite image 93a and a composite image 93b into the image data storing portion 31 (S312). In the embodiment, since the size of basic image 91 is larger than that of the sub-image 92 and the size of each of the formed composite images 93a and 93b coincides with that of the basic image 91, the areas to be deleted do not exist.

Subsequently, the apparatus managing section 75 allows the image output section 16 to print the composite image stored in the image data storing portion 31 onto the recording paper and allows the ejecting portion to eject the recording paper (S313).

After that, the apparatus managing section 75 allows the presence or absence of the next medium in the continuous obtaining portion to be detected (S314). In the embodiment, since the continuous obtaining portion is the second image obtaining portion 78, the apparatus managing section 75 allows the second presence/absence detecting portion 26 to detect the presence or absence of the next original in the second setting portion 25. If the presence of the original is detected, the operations of S304 to S314 are repeated.

If the absence of the medium in the continuous obtaining portion is detected in S314, the image forming apparatus 70 finishes the processing routine.

If it is decided in S306 that the size of basic image 91 and that of the sub-image 92 coincide, in a manner similar to the embodiment 2, the image composing portion 62 overlays the basic image 91 and the sub-image 92 stored in the image data storing portion 31 every line from the start line 94a side of the basic image 91 and from the end line 95b of the sub-image 92, thereby forming the composite image 93 (S316). The formed composite image 93 is stored into the image data storing portion 31 (S316).

In the case of overlaying the two images without executing the image expansion/contraction as mentioned above, the composite image is formed by overlaying the two images by using the composition reference line of the priority image which has previously been designated as a reference.

A flow of the image composing process which is executed in the case where the priority obtaining portion designated by the priority information is the basic image obtaining portion and the image expansion/contraction information is the zoom information, that is, if the image expansion/contraction is executed (composition conditions c in FIG. 11) will now be described.

Since the operations in S301 to S308 are substantially the same as those in the case where the image expansion/contraction is not executed, their description is omitted here.

If it is decided in S308 that the image expansion/contraction is executed, the apparatus managing section 75 allows the image expansion/contraction discriminating portion 88 to decide the expanding/contracting magnification of the sub-image 92 so that the size of sub-image 92 coincides with that of the image obtained by the priority obtaining portion, that is, the basic image 91. The apparatus managing section 75 allows the image expanding or contracting portion 90 to expand or contract the sub-image 92 on the basis of the expanding/contracting magnification.

For example, the image expansion/contraction discriminating portion 88 compares a value obtained by (length in the longitudinal direction of the basic image 91)/(length in the longitudinal direction of the sub-image 92)

with a value obtained by (length in the lateral direction of the basic image 91)/(length in the lateral direction of the sub-image 92)

and sets the smaller value to the expanding/contracting magnification of the sub-image 92 (S317). The image expanding or contracting portion 90 expands or contracts the sub-image 92 on the basis of the expanding/contracting magnification (S317). The image data of the expanded/contracted sub-image 92 is stored as an expansion/contraction sub-image 97 into the image data storing portion 31 (S317).

Subsequently, the apparatus managing section 75 allows the image composing portion 62 to form a composite image on the basis of the layout pattern corresponding to the layout No. 1 (S318). That is, the image composing portion 62 forms a composite image 93c by overlaying the basic image 91 and the expansion/contraction sub-image 97 stored in the image data storing portion 31. The formed composite image 93c is stored into the image data storing portion 31 (S318).

The apparatus managing section 75 allows the image output section 16 to print the composite image stored in the image data storing portion 31 onto the recording paper and allows the ejecting portion to eject the recording paper (S313).

After that, the apparatus managing section 75 allows the presence or absence of the next medium in the continuous obtaining portion to be detected (S314). The operations of S304 to S314 are repeated until it is detected that the medium does not exist in the continuous obtaining portion.

If the priority obtaining portion is the basic image obtaining portion and the two images are overlaid by executing the image expansion/contraction as mentioned above, the composite image is formed by overlaying the basic image and the expansion/contraction sub-image obtained by expanding or contracting the sub-image so as to coincide with the size of the image in the priority obtaining portion, that is, the basic image.

A flow of the image composing process which is executed in the case where the priority obtaining portion designated by the priority information is the sub-image obtaining portion and the image expansion/contraction information is the equal magnification information, that is, if the image expansion/contraction is not executed (composition conditions d and e in FIG. 11) will now be described.

Since the operations in S301 to S307 are substantially the same as those in the case where the priority obtaining portion is the basic image obtaining portion, their description is omitted here.

If it is determined in S307 that the priority obtaining portion is the sub-image obtaining portion, that is, the second image obtaining portion 78, the apparatus managing section 75 allows the image expansion/contraction discriminating portion 88 to discriminate whether or not the image expansion/contraction is executed (S319). The image expansion/contraction discriminating portion 88 reads out the image expansion/contraction information stored in the image expansion/contraction information storing portion 84. Since the read-out image expansion/contraction information is the equal magnification information, the image expansion/contraction discriminating portion 88 determines that the image expansion/contraction is not executed (S319).

Subsequently, the apparatus managing section 75 allows the reference line discriminating portion 89 to discriminate the composition reference line (S320). The reference line discriminating portion 89 reads out the reference line information stored in the reference line information storing portion 85. If the read-out reference line information is the start line information, it is determined that the composition reference line is the start line and, if it is the end line information, it is determined that the composition reference line is the end line (S320).

If it is determined that the composition reference line is the start line (S320), the apparatus managing section 75 allows the image composing portion 62 to form the composite image 93 on the basis of the layout pattern corresponding to the layout No. 1 by using the start line 94 of the priority image as a composition reference line (S321). That is, the image composing portion 62 overlays the basic image 91 and the sub-image 92 stored in the image data storing portion 31 so that the end line 95a of the basic image 91 overlaps the start line 94b of the sub-image 92 by using the start line 94b of the priority image, that is, the sub-image 92 as a reference, thereby forming a composite image (S321).

If it is determined that the composition reference line is the end line (S320), the apparatus managing section 75 allows the image composing portion 62 to form the composite image 93 on the basis of the layout pattern corresponding to the layout No. 1 by using the end line 95 of the priority image as a composition reference line (S322). That is, the image composing portion 62 overlays the basic image 91 and the sub-image 92 stored in the image data storing portion 31 so that the start line 94a of the basic image 91 overlaps the end line 95b of the sub-image 92 by using the end line 95b of the priority image, that is, the sub-image 92 as a reference, thereby forming a composite image (S322).

In the formed composite images, the image obtained by the priority obtaining portion, that is, the image data of an area out of the area of the sub-image 92 is deleted and only the image data of an area which coincides with the area of the sub-image 92 is stored as a composite image 93d or a composite image 93e into the image data storing portion 31 (S323). In the embodiment, since the size of sub-image 92 is equal to ½ of that of the basic image 91, the size of each of the composite images 93 formed in S322 and S323 is twice as large as that of the sub-image 92, and the image data of the area out of the area of the sub-image 92 is deleted (composite images 93d and 93e in FIG. 11).

Subsequently, the apparatus managing section 75 allows the image output section 16 to print the composite image stored in the image data storing portion 31 onto the recording paper and allows the ejecting portion to eject the recording paper (S313).

After that, the apparatus managing section 75 allows the presence or absence of the next medium in the continuous obtaining portion to be detected (S314). The operations of S304 to S314 of the composite images are repeated until it is detected that the medium does not exist in the continuous obtaining portion.

As mentioned above, in the overlaying of the two images which are not expanded/contracted, if the size of the image obtained by the priority obtaining portion, that is, the priority image is smaller than that of the other image, the image data of the out-of-area is deleted so that the size of composite image coincides with that of the priority image.

A flow of the image composing process which is executed in the case where the priority obtaining portion designated by the priority information is the sub-image obtaining portion and the image expansion/contraction information is the zoom information, that is, if the image expansion/contraction is executed (composition conditions f in FIG. 11) will now be described.

Since the operations in S301 to S307 and S320 are substantially the same as those in the case where the image expansion/contraction is not executed (composition conditions d and e in FIG. 11), their description is omitted here.

If it is determined in S320 that the image expansion/contraction is executed, the apparatus managing section 75 allows the image expansion/contraction discriminating portion 88 to decide the expanding/contracting magnification of the basic image 91 so as to coincide with the size of the image obtained by the priority obtaining portion, that is, the sub-image 92. The apparatus managing section 75 allows the image expanding or contracting portion 90 to expand or contract the basic image 91 on the basis of the expanding/contracting magnification.

For example, the image expansion/contraction discriminating portion 88 compares a value obtained by (length in the longitudinal direction of the sub-image 92)/(length in the longitudinal direction of the basic image 91)

with a value obtained by (length in the lateral direction of the sub-image 92)/(length in the lateral direction of the basic image 91)

and sets the smaller value to the expanding/contracting magnification of the basic image 91 (S324). The image expanding or contracting portion 90 expands or contracts the basic image 91 on the basis of the expanding/contracting magnification (S324). The image data of the expanded/contracted basic image 91 is stored as an expansion/contraction basic image 96 into the image data storing portion 31 (S324).

Subsequently, the apparatus managing section 75 allows the image composing portion 62 to form a composite image on the basis of the layout pattern corresponding to the layout No. 1 (S325). That is, the image composing portion 62 forms a composite image 93f by overlaying and the expansion/contraction basic image 96 and the sub-image 92 stored in the image data storing portion 31. The formed composite image 93f is stored into the image data storing portion 31 (S325).

The apparatus managing section 75 allows the image output section 16 to print the composite image stored in the image data storing portion 31 onto the recording paper and allows the ejecting portion to eject the recording paper (S313).

After that, the apparatus managing section 75 allows the presence or absence of the next medium in the continuous obtaining portion to be detected (S314). The operations of S304 to S314 are repeated until it is detected that the medium does not exist in the continuous obtaining portion.

If the priority obtaining portion is the sub-image obtaining portion and the two images are overlaid by executing the image expansion/contraction as mentioned above, the composite image is formed by overlaying the sub-image and the expansion/contraction basic image obtained by expanding or contracting the basic image so as to coincide with the size of the image in the priority obtaining portion, that is, the sub-image.

As mentioned above, according to the embodiment, even in the composing process of a plurality of images having the different image sizes, by designating the size of composite image, the execution or non-execution of the image expansion/contraction, and the composition reference line, a plurality of composite images can be automatically formed and the using range is further widened.

Although the size of composite image and the expanding/contracting magnification of the image are determined so as to coincide with the size of priority image in the embodiment, the operator can preliminarily set an arbitrary size and an arbitrary expanding/contracting magnification. Similarly, although the position of the composition reference line is also limited to the start line or the end line, the operator can also arbitrarily set it.

Embodiment 4

Figure 14:
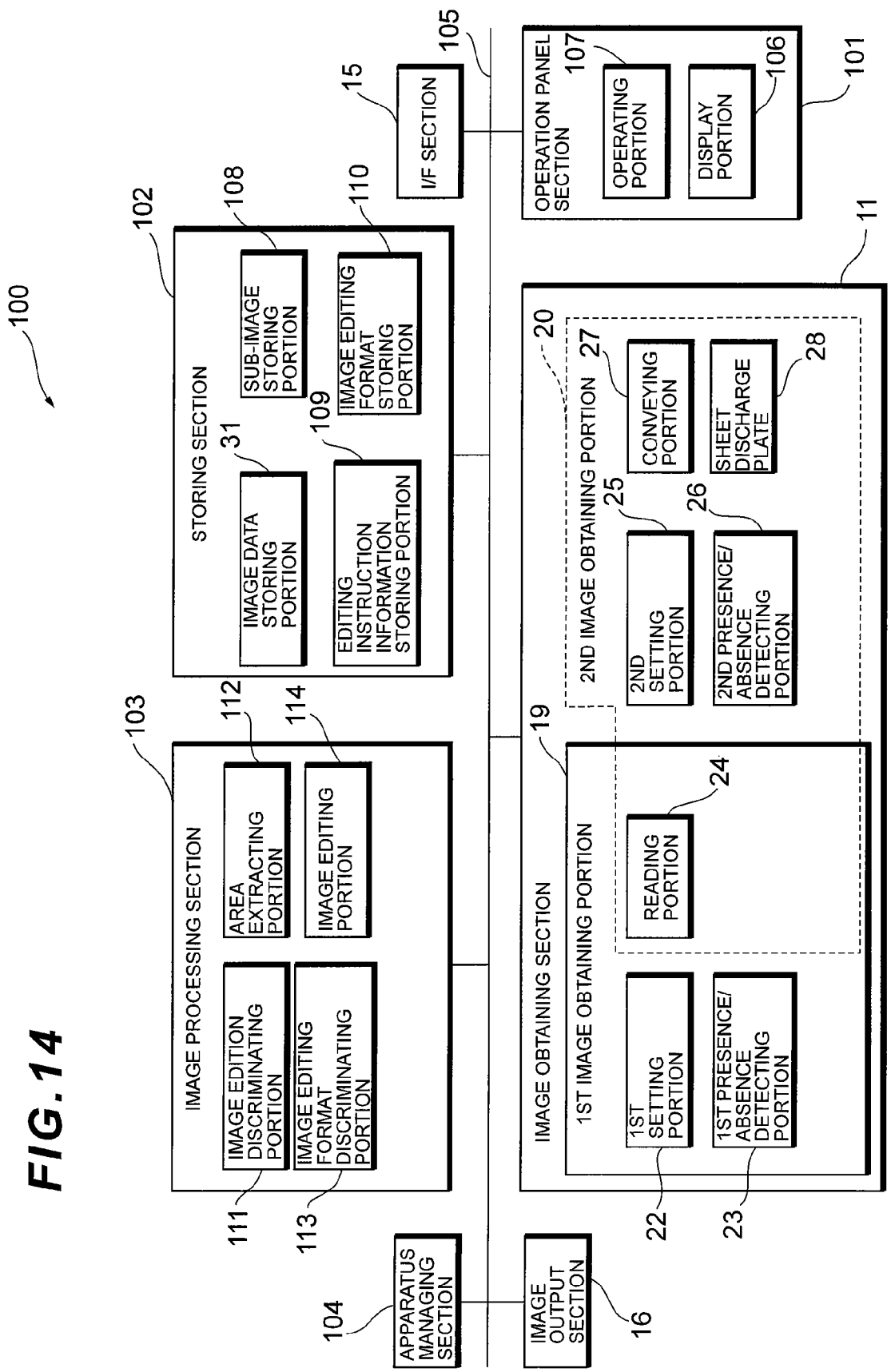
FIG. 14 is a block diagram of a construction of an embodiment 4 of an image forming apparatus according to the invention.

FIG. 14 is a block diagram of a construction of an embodiment 4 of an image forming apparatus according to the invention.

In the embodiment 4, the same or similar component elements as those in the embodiments 1 to 3 are designated by the same reference numerals and their description is omitted here.

As shown in FIG. 14, an image forming apparatus 100 has the image obtaining section 11, an operation panel section 101, a storing section 102, an image processing section 103, the interface (I/F) section 15, the image output section 16, and an apparatus managing section 104. Those sections are connected through a bus 105.

The image obtaining section 11 has the first image obtaining portion 19 and the second image obtaining portion 20.

In the embodiment, it is assumed that the first image obtaining portion 19 is an area designation image obtaining portion to obtain an area designation image and the second image obtaining portion 20 is a basic image obtaining portion and a continuous obtaining portion to continuously obtain a plurality of basic images.

The operation panel section 101 has a display portion 106 and an operating portion 107.

The display portion 106 is constructed by a display device and has a function for displaying a plurality of image editing formats stored in an image editing format storing portion 110, which will be explained hereinafter, to the operator.

The operating portion 107 is constructed by input devices such as touch panel, keyboard, and the like for inputting the instructions from the operator and the information. The operating portion 107 has a function as an input portion for allowing the operator to input editing instruction information, an editing number, and the like, which will be explained hereinafter.

The storing section 102 has the image data storing portion 31, a sub-image storing portion 108, an editing instruction information storing portion 109, and the image editing format storing portion 110.

The sub-image storing portion 108 is a storing portion for storing image data of a sub-image which is used for an image editing process, which will be explained hereinafter. The sub-image is obtained by the image obtaining section 11 or inputted from the external apparatus (not shown) through the I/F section 15 and stored into the sub-image storing portion 108.

The editing instruction information storing portion 109 is a storing portion for storing the editing instruction information to instruct the execution of the image editing process. In the embodiment, the editing instruction information is inputted by the operator through the operating portion 107 of the operation panel section 101. The editing instruction information which is stored into the editing instruction information storing portion 109 includes the editing number, specific area information to designate a specific area, color information which is used for the image editing process, and the like, which will be explained hereinafter.

The image editing format storing portion 110 is a storing portion for storing formats of a plurality of image editing processes.

FIG. 15 is an explanatory diagram showing examples of the image editing formats.

In the embodiment, as shown in FIG. 15, the formats of five image editing processes corresponding to the editing numbers 1 to 5 have been stored in the image editing format storing portion 110. FIG. 15 illustrates the following images in correspondence to the editing numbers: an image obtained by reading one sheet of original set onto the first setting portion 22 of the first image obtaining portion 19 as an area designation image obtaining portion, that is, an area designation image 115; three images obtained by sequentially reading three sheets of originals set onto the second setting portion 25 of the second image obtaining portion 20 as a continuous obtaining portion and as a basic image obtaining portion, that is, three basic images 116a, 116b, and 116c; and three edition images 117 formed after the image editing processes.

The image editing process corresponding to the editing No. 1 is a composition editing process. A sub-image 118a which has previously been stored in the sub-image storing portion 108 is overlaid to the image in the specific area of a basic image 116, thereby composing an image.

The image editing process corresponding to the editing No. 2 is a replacement editing process. The image in the specific area of the basic image 116 is replaced by a sub-image 118b which has previously been stored in the sub-image storing portion 108.

The image editing processes of the editing Nos. 1 and 2 are used, for example, for insertion of a logotype, an advertisement, or the like into a part of a paper document, creation of materials per specific address, or the like.

The image editing process of the editing No. 3 is a deletion editing process. The image in the specific area of the basic image 116 is deleted.

The image editing process corresponding to the editing No. 3 is used, for example, in the case where a date of creation of the materials written in a header portion is deleted and the copy is executed, or the like.

The image editing process corresponding to the editing No. 4 is a color conversion editing process. The image in the specific area of the basic image 116 is converted into a designation color. The designation color is preliminarily designated by the foregoing color information stored in the editing instruction information storing portion 109.

The image editing process of the editing No. 4 is used, in the case where only the image in the specific area is displayed in a color in order to emphasize a part of the image and the images in the areas out of the specific area are displayed in a monochromatic color, or the like.

The image editing process corresponding to the editing No. 5 is a painting editing process. The image in the specific area of the basic image 116 is painted in the designation color. In a manner similar to the case of the editing No. 4, the designation color is preliminarily designated by the color information stored in the editing instruction information storing portion 109.

The image editing process of the editing No. 5 is used for decoration, emphasis, or the like of the copy image.

The image processing section 103 has an image edition discriminating portion 111, an area extracting portion 112, an image editing format discriminating portion 113, and an image editing portion 114.

The image edition discriminating portion 111 has a function as a control portion for making the area designation image obtaining portion and the basic image obtaining portion operative, that is, for making the first image obtaining portion 19 and the second image obtaining portion 20 operative. In other words, the image edition discriminating portion 111 has a function for discriminating whether or not the editing instruction information has been stored in the editing instruction information storing portion 109 in the storing section 102.

The area extracting portion 112 has a function for extracting the specific area which is used to execute the image editing process from the area designation image obtained by the area designation image obtaining portion. In the embodiment, it is assumed that the following well-known technique is used for the extraction of the specific area by the area extracting portion 112.

First, the area extracting portion 112 raster-operates the image data of the original obtained as a binary image by the area designation image obtaining portion, that is, the area designation image 115, thereby detecting points of a pixel value 1. The area extracting portion 112 traces an outline of the detected points, thereby obtaining an outline showing the outer edges of the specific area. The outline of the extracted specific area is converted into coordinate points. Information showing the coordinate points in the outline is stored as specific area information into the editing instruction information storing portion 109.

Although the specific area is an area in the outline in the embodiment, an area out of the outline can be also used as a specific area.

The image editing format discriminating portion 113 has a function for reading out the editing number included in the editing instruction information stored in the editing instruction information storing portion 109 in the storing section 102 and discriminating the image editing format corresponding to the read-out editing number on the basis of a plurality of editing formats stored in the image editing format storing portion 110.

The image editing portion 114 has a function for editing the image on the basis of the image editing format determined by the image editing format discriminating portion 113, thereby forming an edition image.

Examples of the image edition using the image forming apparatus 100 of the embodiment will now be described.

Prior to executing the image editing process, first, the operator operates the operating portion 107 of the operation panel section 101, selects a desired one of a plurality of image editing formats displayed on the display portion 106, and inputs the corresponding editing number. The inputted editing number is stored into the editing instruction information storing portion 109.

When the editing No. 1 or 2 is inputted, the operator obtains a sub-image 118 by the image obtaining section 11 or inputs the sub-image 118 from the external apparatus through the I/F section 15 and stores it into the sub-image storing portion 108.

When the editing No. 4 or 5 is inputted, the operator selects the designation color by operating the operating portion 107. The selected designation color is stored as color information into the editing instruction information storing portion 109.

The operator sets one sheet of original onto the first setting portion 22 and sets a plurality of original onto the second setting portion 25.

In the embodiment, it is assumed that the first image obtaining portion 19 has previously been designated as an area designation image obtaining portion and the second image obtaining portion 20 has previously been designated as a basic image obtaining portion and is the continuous obtaining portion.

A flow of the image editing process which is executed by the image forming apparatus 100 will now be described with reference to a flowchart.

Figure 16:
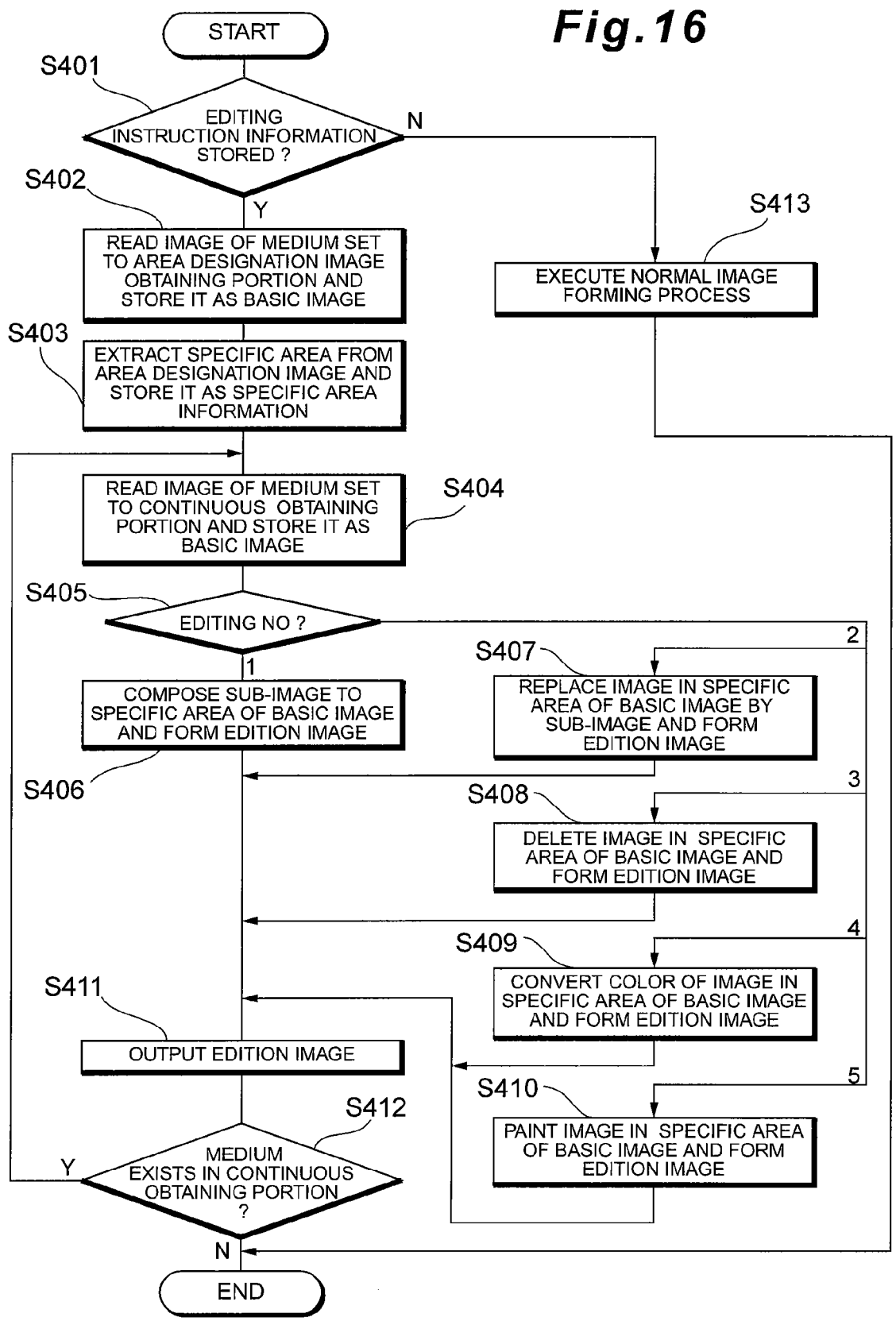
FIG. 16 is a flowchart showing the operation in the embodiment 4 of the image forming apparatus according to the invention.

FIG. 16 is the flowchart showing the operation in the embodiment 4 of the image forming apparatus according to the invention.

First, when the operator presses the execution button for instructing the start of the image creation by using the operating portion 107, the apparatus managing section 104 controls the image edition discriminating portion 111 so as to discriminate whether or not the editing instruction information has been stored in the editing instruction information storing portion 109 (S401). If it is determined that the editing instruction information is not stored (S401), the normal image forming process is executed (S413).

If it is determined that the editing instruction information has been stored (S401), the apparatus managing section 104 allows the area designation image obtaining portion, that is, the first image obtaining portion 19 to obtain the image (S402). The reading portion 24 reads the image of the original set onto the first setting portion 22, thereby obtaining the image data. The obtained image data is stored as an area designation image 115 into the image data storing portion 31 (S402).

Subsequently, the apparatus managing section 104 allows the area extracting portion 112 to extract the specific area from the area designation image 115 (S403). The area extracting portion 112 extracts the specific area from the area designation image 115 stored in the image data storing portion 31 and allows the editing instruction information storing portion 109 to store the extracted specific area as specific area information (S403).

Subsequently, the apparatus managing section 104 allows the continuous obtaining portion, that is, the second image obtaining portion 20 to obtain the image (S404). The conveying portion 27 conveys the first one of a plurality of originals set onto the second setting portion 25 to the sheet discharge plate 28 through the reading portion 24. The reading portion 24 reads the image of the conveyed original, thereby obtaining the image data. The obtained image data is stored as a basic image 116 into the image data storing portion 31 (S404).

When the area designation image 115 and the basic image 116 are obtained, the apparatus managing section 104 allows the image editing format discriminating portion 113 to read out the editing number included in the editing instruction information (S405). The image editing format discriminating portion 113 discriminates the image editing format corresponding to the read-out editing number on the basis of a plurality of editing formats stored in the image editing format storing portion 110 (S405).

Subsequently, the apparatus managing section 104 allows the image editing portion 114 to execute the image editing process based on the editing number (S406 to S410).

If the editing number is determined to be 1 (S405), the image editing portion 114 executes the image composing process for composing with the sub-image 118 to the specific area of the basic image 116 (S406). That is, the image editing portion 114 reads out the basic image 116 stored in the image data storing portion 31 and the specific area information stored in the editing instruction information storing portion 109, thereby deciding the specific area in the basic image 116. The image editing portion 114 reads out the sub-image 118a from the sub-image storing portion 108, overlays the read-out sub-image 118a to the image in the specific area of the basic image 116, and executes the image composing process, thereby forming an edition image 117-1. The formed edition image 117-1 is stored into the image data storing portion 31 (S406).

If the editing number is determined to be 2 (S405), the image editing portion 114 executes the replacement editing process with the sub-image 118 to the specific area of the basic image 116 (S407). That is, the image editing portion 114 reads out the basic image 116 stored in the image data storing portion 31 and the specific area information stored in the editing instruction information storing portion 109, decides the specific area in the basic image 116, and deletes the image of the specific area in the basic image 116. The image editing portion 114 further reads out the sub-image 118b from the sub-image storing portion 108, overlays the read-out sub-image 118b to the image in the specific area of the basic image 116, and executes the image composing process, thereby forming an edition image 117-2. The formed edition image 117-2 is stored into the image data storing portion 31 (S407).

If the editing number is determined to be 3 (S405), the image editing portion 114 executes the deletion editing process to the specific area of the basic image 116 (S408). That is, the image editing portion 114 reads out the basic image 116 stored in the image data storing portion 31 and the specific area information stored in the editing instruction information storing portion 109, decides the specific area in the basic image 116, and deletes the image of the specific area in the basic image 116, thereby forming an edition image 117-3. The formed edition image 117-3 is stored into the image data storing portion 31 (S408).

If the editing number is determined to be 4 (S405), the image editing portion 114 executes the color conversion editing process to the specific area of the basic image 116 (S409). That is, the image editing portion 114 reads out the basic image 116 stored in the image data storing portion 31 and the specific area information stored in the editing instruction information storing portion 109 and decides the specific area in the basic image 116. The image editing portion 114 further reads out the color information stored in the editing instruction information storing portion 109 and executes the converting process into the color designated by the read-out color information to the image in the specific area of the basic image 116, thereby forming an edition image 117-4. The formed edition image 117-4 is stored into the image data storing portion 31 (S409).

If the editing number is determined to be 5 (S405), the image editing portion 114 executes the painting editing process to the specific area of the basic image 116 (S410). That is, the image editing portion 114 reads out the basic image 116 stored in the image data storing portion 31 and the specific area information stored in the editing instruction information storing portion 109 and decides the specific area in the basic image 116. The image editing portion 114 further reads out the color information stored in the editing instruction information storing portion 109 and executes the painting process to the specific area of the basic image 116 so as to paint the image in the color designated by the read-out color information, thereby forming an edition image 117-5. The formed edition image 117-5 is stored into the image data storing portion 31 (S410).

Subsequently, the apparatus managing section 104 allows the image output section 16 to print the edition image 117 stored in the image data storing portion 31 onto the recording paper and allows the ejecting portion to eject the recording paper (S411).

After that, the apparatus managing section 104 allows the presence or absence of the next medium in the continuous obtaining portion, that is, the second image obtaining portion 20 to be detected (S412). The second presence/absence detecting portion 26 detects the presence or absence of the next original in the second setting portion 25. If it is detected that the original exists, the image forming apparatus 100 repeats the operations of S404 to S412.

If the absence of the medium in the continuous obtaining portion is detected in S412, the image forming apparatus 100 finishes the processing routine.

By designating the specific area of the image by using the original and executing the image editing process only to the specific area in the embodiment as mentioned above, the edition image can be obtained without executing the patching or the like of the original. The annoying work becomes unnecessary. The deterioration of the image quality and the wasteful consumption of the consumables can be suppressed. Since the operator can arbitrarily hand-write to the original which is used to obtain the area designation image for designating the specific area, there is no need to use any special apparatus for designating the specific area, to be familiar with the operation, or the like. The operation is simplified.

Although the first image obtaining portion is assumed to be the area designation image obtaining portion, the second image obtaining portion is assumed to be the basic image obtaining portion and the continuous obtaining portion, and the obtainment of the area designation image and the basic image and the image editing process are executed in the embodiment, an arbitrary combination can be also used. In this case, an image obtaining portion information storing portion is further provided for the storing portion and information showing to which portions the area designation image obtaining portion, the basic image obtaining portion, and the continuous obtaining portion correspond is preliminarily stored as image obtaining portion information into the image obtaining portion information storing portion. On the other hand, an image obtaining portion information discriminating portion is further provided for the image processing section. When the image is obtained, the image obtaining portion information discriminating portion reads out the image obtaining portion information from the image obtaining portion information storing portion and discriminates to which portions the area designation image obtaining portion and the continuous obtaining portion correspond. Thus, a plurality of edition images can be continuously formed in an arbitrary combination. The using range is further widened.

The digital camera or image scanner can be also used as a first image obtaining portion or a second image obtaining portion. Thus, images photographed by the digital camera or images obtained by the image scanner are not printed onto the paper medium but edition images can be formed.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus having a first image obtaining portion which reads and obtains an image of a sheet medium as a first image, a second image obtaining portion which can continuously read and obtain each image of a plurality of sheet media as a second image, and an image output section which outputs the image, comprising:
    an input portion which inputs composition instruction information for instructing composition of said first image and each of said second images;
    a control portion which makes said first image obtaining portion and said second image obtaining portion operative when said composition instruction information is inputted;
    a priority discriminating portion which obtains priority information and discriminates which one of the first image obtaining portion and the second image obtaining portion is a priority image obtaining portion according to the obtained priority information; and
    an image composing portion which forms each composite image by overlaying said first image obtained by said first image obtaining portion and each of said second images sequentially obtained by said second image obtaining portion on the basis of the image obtained by said priority image obtaining portion being discriminated by said priority discriminating portion,
    wherein said image output section outputs said composite images formed by said image composing portion.

2. The image forming apparatus according to claim 1, further comprising:
    an image storing portion which stores said first image; and
    a detecting portion which detects whether or not said second images can be further obtained by said second image obtaining portion when said composite images are outputted by said image output section,
    and wherein if it is detected by said detecting portion that said second images can be obtained, said second image obtaining portion further obtains the second image and said image composing portion further forms the composite image by composing said first image stored in said image storing portion and said second image obtained by said second image obtaining portion.

3. The image forming apparatus according to claim 1, further comprising a layout storing portion which stores a layout of said first image and said second image in said composite image,
    and wherein said image composing portion forms said composite image by arranging said first image and said second image on the basis of said layout stored in said layout storing portion.

4. The image forming apparatus according to claim 3, further comprising:
    a layout pattern storing portion which stores a plurality of layout patterns of said first image and said second image in said composite image; and
    a selecting portion which allows an operator to select one of said plurality of layout patterns stored in said layout pattern storing portion,
    and wherein said layout pattern storing portion stores said layout pattern selected by said selecting portion as said layout.

5. The image forming apparatus according to claim 1, wherein said input portion further has a priority size detecting portion which inputs priority information for designating one of said first image obtaining portion and said second image obtaining portion as a priority image obtaining portion which obtains a priority image and detects a size of said priority image,
    and said image composing portion further forms said composite image on the basis of said detected size.

6. The image forming apparatus according to claim 1, wherein said input portion further has:
    an image expansion/contraction information storing portion which inputs priority information for designating one of said first image obtaining portion or said second image obtaining portion as a priority image obtaining portion which obtains a priority image and designating the other as a sub-image obtaining portion which obtains a sub-image and image expansion/contraction information for instructing to expand or contract the image and stores said image expansion/contraction information;
    a priority size detecting portion which detects a size of said priority image;
    a sub-image size detecting portion which detects a size of said sub-image;
    a comparison discriminating portion which compares the detected size of said priority image with the detected size of said sub-image and discriminates;
    an image expansion/contraction discriminating portion which discriminates whether or not said image expansion/contraction information has been stored in said image expansion/contraction information storing portion if it is determined by said comparison discriminating portion that the size of said priority image and the size of said sub-image differ; and
    an image expanding or contracting portion which expands or contracts said sub-image so as to coincide with the size of said priority image if it is determined by said image expansion/contraction discriminating portion that said image expansion/contraction information has been stored,
    and said image composing portion forms said composite image by composing said priority image and said expanded or contracted sub-image.

7. The image forming apparatus according to claim 1, wherein said first image obtaining portion or said second image obtaining portion comprises a digital camera.

8. The image forming apparatus according to claim 1, wherein said first image obtaining portion or said second image obtaining portion comprises an image scanner.

9. The image forming apparatus according to claim 1, wherein said first image obtaining portion has:
   a first setting portion which sets the medium; and
   a reading portion which reads the image of said medium, as said first image, which has been set to said first setting portion.

10. The image forming apparatus according to claim 9, wherein said first setting portion comprises platen glass on which a non-standard-size medium can be set.

11. The image forming apparatus according to claim 1, wherein said second image obtaining portion has:
   a second setting portion on which a plurality of standard-size media can be set;
   a conveying portion which sequentially conveys a plurality of said originals; and
   a reading portion which can continuously reads images of said plurality of originals, as said second images, which have sequentially been conveyed by said conveying portion.

12. The image forming apparatus according to claim 11, wherein said conveying portion comprises an automatic document feeder.

13. The image forming apparatus according to claim 1, wherein:
   said first image obtaining portion has a first setting portion which sets the medium and a reading portion which reads the image of said medium, as said first image, which has been set to said first setting portion;
   said second image obtaining portion has a second setting portion on which a plurality of standard-size originals can be set and a conveying portion which sequentially conveys a plurality of said originals to said reading portion;
   said reading portion further reads the images of said originals, as said second images, which have sequentially been conveyed by said conveying portion;
   said image composing portion forms said composite image by composing said first image and each of said second images; and
   said image output section outputs said composite images.

14. The image forming apparatus according to claim 13, further comprising:
   an image storing portion which stores said first image; and
   a presence/absence detecting portion which detects the presence or absence of said original in said second setting portion when said composite image is outputted by said image output section,
   and wherein when the presence of said original is detected by said presence/absence detecting portion, said conveying portion further conveys said original to said reading portion, said reading portion further reads said original conveyed by said conveying portion as said second image, and said image composing portion forms said composite image by composing said first image stored in said image storing portion and said second image read by said reading portion.

15. The image forming apparatus according to claim 13, wherein said first setting portion comprises platen glass on which a non-standard-size medium can be set and said conveying portion comprises an automatic document feeder.

16. The image forming apparatus according to claim 1, wherein the priority discriminating portion further discriminates which one of the first image obtaining portion and the second image obtaining portion is a non-priority image obtaining portion according to the obtained priority information, and
   the image composing portion changes an image size of an image obtained by the non-priority image obtaining portion on the basis of a standard image size that is a size of the image obtained by the priority image obtaining portion.

17. An image forming apparatus having a first image obtaining portion which reads and obtains an image of a sheet medium as a first image, a second image obtaining portion which can continuously read and obtain each image of a plurality of sheet media as a second image, and an image output section which outputs the image, comprising:
   a first detecting portion which detects whether or not said first image can be obtained by said first image obtaining portion;
   a second detecting portion which detects whether or not said second image can be obtained by said second image obtaining portion;
   an image composition discriminating portion which discriminates whether or not said first image and said second image are composed on the basis of the detection by said first detecting portion and the detection by said second detecting portion;
   a control portion which makes said first image obtaining portion and said second image obtaining portion operative when said image composition discriminating section discriminates that said first image and said second image are composed;
   a priority discriminating portion which obtains priority information and discriminates which one of the first image obtaining portion and the second image obtaining portion is a priority image obtaining portion according to the obtained priority information; and
   an image composing portion which forms each composite image by overlaying said first image obtained by said first image obtaining section and each of said second images sequentially obtained by said second image obtaining portion on the basis of the image obtained by said priority image obtaining portion being discriminated by said priority discriminating portion,
   said image output section outputs said composite image formed by said image composing portion.

18. The image forming apparatus according to claim 17, further comprising:
   a layout pattern storing portion which stores a plurality of layout patterns of said first image and said second image in said composite image; and
   a selecting portion which allows an operator to select one of said plurality of layout patterns stored in said layout pattern storing portion,
   and wherein said image composing portion forms said composite image by arranging said first image and said second image on the basis of said selected layout pattern.

19. The image forming apparatus according to claim 17, wherein said input portion further has:
   an image expansion/contraction information storing portion which inputs priority information for designating one of said first image obtaining portion or said second image obtaining portion as a priority image obtaining portion which obtains a priority image and designating the other as a sub-image obtaining portion which obtains a sub-image and image expansion/contraction information for instructing to expand or contract the image and stores said image expansion/contraction information;

a priority size detecting portion which detects a size of said priority image;

a sub-image size detecting portion which detects a size of said sub-image;

a comparison discriminating portion which compares the detected size of said priority image with the detected size of said sub-image and discriminates;

an image expansion/contraction discriminating portion which discriminates whether or not said image expansion/contraction information has been stored in said image expansion/contraction information storing portion if it is determined by said comparison discriminating portion that the size of said priority image and the size of said sub-image differ; and an image expanding or contracting portion which expands or contracts said sub-image so as to coincide with the size of said priority image if it is determined by said image expansion/contraction discriminating portion that said image expansion/contraction information has been stored, and said image composing portion forms said composite image by composing said priority image and said expanded or contracted sub-image.

20. The image forming apparatus according to claim 17, wherein the priority discriminating portion further discriminates which one of the first image obtaining portion and the second image obtaining portion is a non-priority image obtaining portion according to the obtained priority information, and the image composing portion changes an image size of an image obtained by the non-priority image obtaining portion on the basis of a standard image size that is a size of the image obtained by the priority image obtaining portion.

* * * * *